(12) United States Patent
Koshitouge et al.

(10) Patent No.: US 12,236,929 B2
(45) Date of Patent: Feb. 25, 2025

(54) SOUND INSULATION SHEET, MANUFACTURING METHOD THEREOF, AND SOUND INSULATION STRUCTURE

(71) Applicant: Mitsubishi Chemical Corporation, Tokyo (JP)

(72) Inventors: Haruki Koshitouge, Tokyo (JP); Shogo Koga, Tokyo (JP); Naoyuki Uchida, Tokyo (JP); Kazuma Inoue, Tokyo (JP); Masanari Nakayama, Tokyo (JP); Yuya Saito, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 548 days.

(21) Appl. No.: 17/485,730

(22) Filed: Sep. 27, 2021

(65) Prior Publication Data
US 2022/0028363 A1 Jan. 27, 2022

Related U.S. Application Data

(63) Continuation of application No. PCT/JP2020/014435, filed on Mar. 30, 2020.

(30) Foreign Application Priority Data

Mar. 28, 2019 (JP) .................................. 2019-064117
Oct. 3, 2019 (JP) .................................. 2019-182806

(51) Int. Cl.
*G10K 11/162* (2006.01)
*B29C 35/08* (2006.01)
*E04B 1/84* (2006.01)

(52) U.S. Cl.
CPC ........ *G10K 11/162* (2013.01); *B29C 35/0805* (2013.01); *E04B 1/8409* (2013.01);
(Continued)

(58) Field of Classification Search
CPC ................ G10K 11/162; G10K 11/168; B29C 35/0805; E04B 1/8409; E04B 2001/8414;
(Continued)

(56) References Cited

U.S. PATENT DOCUMENTS 7,909,136 B2 * 3/2011 Surace .................. E04B 9/0414
181/290
9,494,857 B2 11/2016 Nakai et al.
(Continued)

FOREIGN PATENT DOCUMENTS

CN 102933373 A 2/2013
CN 107251136 A 10/2017
(Continued)

OTHER PUBLICATIONS

Machine translation of WO-2006000717-A1 (Year: 2006).*
(Continued)

*Primary Examiner* — Forrest M Phillips
*Assistant Examiner* — Jennifer B. Olson
(74) *Attorney, Agent, or Firm* — Oblon, McClelland, Maier & Neustadt, L.L.P.

(57) ABSTRACT

To provide a sound insulation sheet member which is excellent in sound insulation performance in a low frequency band and which has a compact configuration. A sound insulation sheet member 1 including a substrate 2 and a concavo-convex structure 3 placed on at least one surface of the substrate 2, in which the concavo-convex structure 3 is provided by repeatedly arranging a plurality of units each defined as a concavo-convex unit shape 4 including a linear convex portion 5, in one direction at substantially constant intervals on the surface of the substrate 2.

28 Claims, 14 Drawing Sheets

(52) U.S. Cl.
CPC ............... *E04B 2001/8414* (2013.01); *E04B 2001/8452* (2013.01); *E04B 2103/04* (2013.01)

(58) Field of Classification Search
CPC ..... E04B 2001/8428; E04B 2001/8452; E04B 2001/8471; E04B 2103/04
USPC .................. 181/286, 290, 291, 293, 295
See application file for complete search history.

(56) References Cited

U.S. PATENT DOCUMENTS

| | | | |
|---|---|---|---|
| 10,099,317 | B2 | 10/2018 | Hakuta et al. |
| 10,902,835 | B2 | 1/2021 | Ohtsu et al. |
| 11,168,474 | B2 | 11/2021 | Koga et al. |
| 11,600,254 | B2 * | 3/2023 | Scheinhardt ......... G10K 11/168 |
| 2005/0133299 | A1 | 6/2005 | Schnitta |
| 2013/0140744 | A1 | 6/2013 | Nakai et al. |
| 2017/0341186 | A1 | 11/2017 | Hakuta et al. |
| 2018/0002919 | A1 | 1/2018 | Yamazoe et al. |
| 2018/0340328 | A1 | 11/2018 | Koga et al. |
| 2020/0005757 | A1 | 1/2020 | Ohtsu et al. |
| 2022/0018120 | A1 | 1/2022 | Koga et al. |

FOREIGN PATENT DOCUMENTS

| | | | | |
|---|---|---|---|---|
| CN | 107408378 A | 11/2017 | | |
| JP | 60-5937 A | 1/1985 | | |
| JP | 2006-023423 | 1/2000 | | |
| JP | 2000-170123 | 6/2000 | | |
| JP | 2000-265593 | 9/2000 | | |
| JP | 2002258411 A * | 9/2002 | | |
| JP | 2013-231316 | 11/2013 | | |
| JP | 2017-227109 | 12/2017 | | |
| JP | 2019-31899 A | 2/2019 | | |
| TW | 201736693 A | 10/2017 | | |
| WO | WO-2006000717 A1 * | 1/2006 | ............ | B32B 27/04 |
| WO | 2017/135409 | 8/2017 | | |
| WO | WO-2018150828 A1 * | 8/2018 | ............... | E04B 1/84 |

OTHER PUBLICATIONS

Machine translation of JP-2002258411-A (Year: 2002).*
Chinese Office Action & Search Report issued Aug. 3, 2023 in Chinese Application 202080025328.2, (with unedited computer-generated English translation), 20 pages.
Ma Shui et al., "Building glass", Beijing: Chemical Industry Press, Novel Building Material and Construction Technology Question and Answer Cluster book, ISBN 7-5025-2531-9, Chinese version library CIP data core word (1999) No. 07816, (with English translation), 1999, 5 pages.
International Search Report issued Jun. 22, 2020, in PCT/JP2020/014435.
Combined Chinese Office Action and Search Report issued Jan. 19, 2023, in corresponding Chinese Patent Application No. 202080025328.2 (with English Translation), 18 pages.
Extended European Search Report issued Nov. 10, 2022, in corresponding European Patent Application No. 20778837.3, 9 pages.

* cited by examiner

FIG. 18

|  |  |  | Example 1 | Example 2 | Example 3 | Example 4 | Example 5 | Example 6 | Comparative Example 1 | Comparative Example 2 | Comparative Example 3 |
|---|---|---|---|---|---|---|---|---|---|---|---|
| Concavo-convex structure | Shape | | Cuboid | — | — | — | — | — | Cylinder | Cuboid | Cuboid |
| | Number of arrangements | | 1 | — | — | — | — | — | 2 | 1 | 1 |
| | Convex portion width (diameter) | mm | 5 | 5 | 5 | 5 | 5 | 5 | 5 | 5 | 5 |
| | Height | mm | 5 | 5 | 2.5 | 5 | 5 | 2.5 | 5 | 5 | 5 |
| | Concave portion width | mm | 5 | 25 | 25 | 5 | 25 | 25 | 5 | 25 | 25 |
| | Specific gravity | | 1.05 | 1.05 | 1.05 | 1.05 | 1.05 | 1.05 | 1.05 | 1.05 | 1.05 |
| | (Convex portion width × Height) × Specific gravity/Concave portion width | | 5.3 | 1.26 | 0.63 | 5.3 | 1.26 | 0.63 | 5.3 | 1.26 | 1.26 |
| Substrate | Thickness | μm | 125 | 125 | 125 | 250 | 250 | 250 | 250 | 250 | 250 |
| | Specific gravity | | 1.4 | 1.4 | 1.4 | 1.4 | 1.4 | 1.4 | 1.4 | 8.9 | 0.2 |
| | Surface density | kg/m3 | 0.175 | 0.175 | 0.175 | 0.35 | 0.35 | 0.35 | 0.35 | 2.10 | 0.03 |
| | Young's modulus | GPa | 4 | 4 | 4 | 4 | 4 | 4 | 4 | 130 | 0.002 |
| | Material | | PET | PET | PET | PET | PET | PET | PET | Copper | Non-woven fabric |
| Sound insulation peak frequency | | Hz | 800 | 250 | 400 | 1000 | 500 | 500 | 1000 | | |
| Sound insulation peak frequency intensity | | dB | 4 | 7.5 | 4 | 4 | 10 | 4 | 6 | | |

FIG. 19

|  | Example 7 | Example 8 | Example 9 | Example 10 | Example 11 | Comparative Example 4 | Comparative Example 5 |
|---|---|---|---|---|---|---|---|
| Sound insulation sheet | Member A | Member A | Member A | Member B | Member B | Member A | Member C |
| Sound absorbing material | Absence | Absence | Member XAl | Absence | Member XAl | Absence | Absence |
| Plate material | Copper plate | Copper plate | Copper plate | Copper plate | Copper plate | Copper plate | Copper plate |
| Space section | Presence | Presence | Presence | Presence | Presence | Absence | Presence |
| Spatial distance | 15mm | 3mm | 15mm | 15mm | 15mm | — | 15mm |
| Sealed space | Presence | Presence | Presence | Presence | Presence | — | Presence |
| Sound insulation peak | Presence | Presence | Presence | Presence | Presence | Absence | Presence |
| Peak frequency | 500Hz | 400Hz | 500Hz | 1000Hz | 800Hz | — |  |
| Transmission loss (ΔTL) (ratio to single Fe) | 10dB | 5dB | 14dB | 6dB | 13dB | — | 5dB |

FIG. 21

|  | Example 12 | Example 13 |
|---|---|---|
| Sound insulation sheet | Sound insulation sheet of Example 7 | Member A: sound insulation sheet of Example 7<br>Member B: sound insulation sheet of Example 10 |
| Sound absorbing material | Absence | Absence |
| Plate material | Copper plate | Copper plate |
| Space section | Presence | Presence |
| Spatial distance | 20mm | 15mm (Member B), 20mm (Member A) |
| Sealed space | Presence | Presence |
| Sound insulation peak | Presence | Presence |
| Peak frequency | 613Hz | 546Hz, 1030Hz |
| Transmission loss | 13.17dB | 16.8dB(546Hz),<br>13.6dB(1030Hz) |

SOUND INSULATION SHEET, MANUFACTURING METHOD THEREOF, AND SOUND INSULATION STRUCTURE

CROSS REFERENCE TO RELATED APPLICATIONS

This application is a continuation of PCT/JP2020/014435, filed Mar. 30, 2020, the disclosure of which is incorporated herein by reference in its entirety. This application claims priority to Japanese Application No. 2019-064117, filed Mar. 28, 2019, and Japanese Application No. 2019-182806, filed Oct. 3, 2019, the disclosures of which are incorporated herein by references in their entireties.

TECHNICAL FIELD the present invention relates to a sound insulation sheet, a manufacturing method thereof, and a sound insulation structure.

BACKGROUND ART

Buildings such as collective housings, office buildings and hotels are needed to block outdoor noise from automobiles, trains, airplanes, ships and/or the like, and equipment noise and human voice occurring in the buildings, thereby keeping quietness suitable for room use. Vehicles such as automobiles, trains, airplanes and ships are also needed to block wind noise and engine noise, thereby reducing indoor noise in order to provide quiet and comfortable spaces to passengers. Thus, there have been researched and developed means for blocking propagation of noise and/or vibration from outdoor to indoor or from outsides to insides of vehicles, namely, sound insulation means. In recent years, there has been a need for sound insulation members adaptable even to complicated shapes in order to address verticalization of buildings, enhancements in energy efficiencies in vehicles and furthermore enhancements in degrees of design freedom of buildings, vehicles and facilities.

Sound insulation members, in particular, sheet-shaped members have been conventionally improved in member structures thereof in order to enhance sound insulation performance. For example, there are known a method where a plurality of rigid flat plate materials such as a gypsum board, cement, a steel plate, a glass plate and a resin plate are used in combination (Patent Literature 1), a method where a gypsum board or the like is used to provide a hollow double wall structure or a hollow triple wall structure (Patent Literature 2), and a method where a flat plate material and a plurality of independent stump-shaped protrusions are used in combination (Patent Literatures 3 and 4).

CITATION LIST

Patent Literature

Patent Literature 1: Japanese Patent Laid-Open No. 2013-231316
Patent Literature 2: Japanese Patent Laid-Open No. 2017-227109
Patent Literature 3: Japanese Patent Laid-Open No. 2000-265593
Patent Literature 4: International Publication No. WO 2017/135409

SUMMARY OF INVENTION

Technical Problem

Among the above conventional sound insulation members, those described in Patent Literature 3 and Patent Literature 4 are each a mode where cylindrical protrusions placed in a plurality of vertical and horizontal rows are provided on a sheet having rubber elasticity and a surface of the sheet, and it is known that the sheet and the protrusions each function as a dynamic vibration absorber against incidence of sound to thereby provide sound insulation/vibration-damping performance beyond the mass law.

In recent years, precision equipment, home appliances and the like are each needed to include a function of blocking sound and/or vibration in a low frequency band, generated by such equipment during use of such equipment, and the sound insulation member in the mode including a sheet having elasticity and cylindrical protrusions has also been studied about shielding performance in the changes in material and size of the protrusions in order to respond to such a need.

However, it is necessary for an increase in sound insulation effect in a low frequency band to enlarge columnar protrusions and/or introduce weights into the protrusions for making such protrusions heavier, and the sound insulation member is naturally increased in thickness and then increased in size and weight and cannot respond to a demand for inclusion thereof in small and light equipment and thus shielding of sound in a low frequency band.

The sound insulation member according to the above mode has the problem of being difficult to mass-produce. When a mold provided with a depressed cavity along with the outer shape of the protrusions on a surface is used in order to respond to such mass production, bubbles are incorporated into the cavity to easily cause molding defects in flowing of a resin material into the cavity and curing of the resin material, and bubbles incorporated into the protrusions of the sound insulation member cause deterioration in sound insulation performance, not enabling any desired sound insulation effect to be obtained.

The present invention has been made in consideration of the above circumstances, and an object thereof is to provide a sound insulation sheet and a sound insulation structure which are each thin and light in weight and excellent in sound insulation performance in a low frequency band. A first object thereof is to enable a sound insulation sheet excellent in sound insulation performance in a low frequency band to be produced without any molding defects caused.

In Patent Literature 4 above, a plurality of resonance parts provided with weight parts are provided to allow the sound insulation effect in a low frequency band to be realized. In this regard, when a sound insulation sheet having no weight is used, the effect is limited. It has been confirmed in Patent Literature 4 that no sufficient sound insulation effect is obtained particularly in a low frequency band if no large weight part is introduced into the upper part of the cylindrical protrusions (see [Examples] of Patent Literature 4 above).

On the other hand, there is also expected a demand for attachment of a sound insulation sheet to an inner wall surface of an exterior plate made of a hard plate material such as iron in order not to leak sound generated by equipment outward.

A second object of the present invention is to provide a sound insulation structure excellent in sound insulation effect, in particular, sound insulation performance in a low frequency band, even in the case of attachment of a sound insulation sheet to a material relatively high in surface density, such as a steel plate.

Solution to Problem

The present inventors have made intensive studies in order to achieve the objects, and as a result, have found that the shape, arrangement and the like of particularly a convex portion are within specified ranges to thereby allow the first object to be achieved, leading to completion of the present invention.

Specifically, the present invention provides a sound insulation sheet including a concavo-convex structure on at least one surface of a sheet-shaped substrate, wherein the concavo-convex structure is formed by repeatedly arranging a concavo-convex unit shape having a convex portion linearly protruded from a sheet surface of the substrate and a concave portion along with the convex portion, in one direction on the sheet surface, and the substrate has a Young's modulus of 1 GPa or more and 10 GPa or less.

The sound insulation sheet of the configuration has a configuration where the substrate has a thickness (d) of 30 μm or more and 500 μm or less.

Additionally, the convex portion in the concavo-convex unit shape has a height (t) of 0.5 mm or more and 10 mm or less.

In the sound insulation sheet of the configuration, the concavo-convex unit shape is within ranges determined by expressions (I) and (II):

$$0.1 \leq w1\ max \times t \times sg/w2 \leq 10 \qquad \text{Expression (I)}$$

$$5 \leq w1\ max \times t \leq 50 \qquad \text{Expression (II)}$$

wherein a maximum width of a transverse section of the convex portion is w1max (mm), a height of the convex portion is t (mm), a width of the concave portion is w2 (mm) and a specific gravity of the convex portion is sg, in the concavo-convex unit shape.

The sound insulation sheet has a configuration where a transverse section of the convex portion in the concavo-convex unit shape has a maximum width (w1max) of 0.5 mm or more and 10 mm or less.

The sound insulation sheet has a configuration where the concave portion in the concavo-convex unit shape has a width (w2) of 3 mm or more and 100 mm or less.

The method for manufacturing a sound insulation sheet of the present invention includes a step of allowing a photo-curable resin to flow into a plurality of concave grooves of a mold where the concave grooves are provided on a surface, a step of overlapping with the mold, a substrate sheet through which a specified ray of light penetrates, the sheet being placed with facing the concave grooves into which the photo-curable resin flows, and subjecting the resultant to pressure bonding, a step of performing irradiation with a specified ray of light through the substrate sheet, to thereby cure the photo-curable resin in the concave grooves and fix the resin to the substrate sheet, and a step of releasing the substrate sheet from the mold.

The method for manufacturing a sound insulation sheet, including the steps, uses a roll-shaped mold obtained by providing on its periphery, a plurality of concave grooves each extending along a circumferential direction.

The sound insulation structure of the present invention includes the sound insulation sheet of the configuration, and a support which supports a surface of the substrate.

The sound insulation structure of the present invention includes the sound insulation sheet of the configuration and a plate material provided opposite to the sound insulation sheet, in which a space section is provided between the sound insulation sheet and the plate material.

The sound insulation structure of the configuration includes a retention unit provided between the sound insulation sheet and the plate material, in which the space section is a space section formed together with the retention unit.

The space section provided between the sound insulation sheet and the plate material is a sealed space closed by both the members and the retention unit.

In the sound insulation structure of the configuration, the retention unit is a frame-shaped member.

In the sound insulation structure of the configuration, a placement interval (g) between the sound insulation sheet and the plate material in the space section is 0.1 mm or more and 50 mm or less.

In the sound insulation structure of the configuration, a sound absorbing material is packed in the space section.

The sound absorbing material is a non-woven fabric.

In the sound insulation structure of the configuration, the plate material has a surface density of 1 $kg/m^2$ or more and 20 $kg/m^2$ or less.

The present inventors have made intensive studies in order to achieve the second object, and as a result, has found that, when a sound insulation structure is configured by attaching a sound insulation sheet to a plate material forming an exterior plate of equipment, it is important for obtaining objective sound insulation performance to hardly propagate vibration of the plate material to the sound insulation sheet, more preferably not to propagate any vibration of the plate material to the sound insulation sheet, leading to completion of the present invention.

Specifically, the sound insulation structure of the present invention has a configuration where the sound insulation structure includes a sound insulation sheet having a concavo-convex structure on at least one surface of a substrate, a plate material provided opposite to the sound insulation sheet, and a retention unit provided between the sound insulation sheet and the plate material, wherein a space section formed by the sound insulation sheet, the plate material and the retention unit is provided between the sound insulation sheet and the plate material.

In the sound insulation structure of the configuration, the space section provided between the sound insulation sheet and the plate material is a sealed space closed by both the members and the retention unit.

The retention unit is a frame-shaped member.

In the sound insulation structure of the configuration, a placement interval (g) between the sound insulation sheet and the plate material in the space section is 0.1 mm or more and 50 mm or less.

In the sound insulation structure of the configuration, a sound absorbing material is packed in the space section.

The sound absorbing material is a non-woven fabric.

The sound insulation structure of the configuration has a configuration where the concavo-convex structure of the sound insulation sheet is formed by repeatedly arranging a concavo-convex unit shape having a convex portion linearly protruded from a sheet surface of the substrate and a concave portion along with the convex portion, in one direction or in two directions on the sheet surface, and the substrate has a thickness (d) of 30 µm or more and 500 µm or less.

In the sound insulation structure of the configuration, the concavo-convex unit shape is within ranges determined by expressions (I) and (II):

$$0.1 \leq w1max \times t \times sg/w2 \leq 10 \quad \text{Expression (I)}$$

$$5 \leq w1max \times t \leq 50 \quad \text{Expression (II)}$$

wherein a maximum width of a transverse section of the convex portion is w1max (mm), a height of the convex portion is t (mm), a width of the concave portion is w2 (mm) and a specific gravity of the convex portion is sg, in the concavo-convex unit shape.

In the sound insulation structure of the configuration, the concavo-convex structure of the sound insulation sheet has a dot-shaped concavo-convex unit shape, and the concavo-convex unit shape has a mass per unit of 20 mg or more and 900 mg or less, and the substrate has a thickness of 30 µm or more and 500 µm or less.

In the sound insulation structure of the configuration, a proportion of an area of the concavo-convex structure in an area of one surface of the substrate is 5% or more and 80% or less.

In the sound insulation structure of the configuration, the concavo-convex structure of the sound insulation sheet contains at least one selected from the group consisting of a thermosetting or photo-curable elastomer, a thermoplastic elastomer, a thermosetting or photo-curable resin and a thermoplastic resin.

In the sound insulation structure of the configuration, the substrate of the sound insulation sheet has a Young's modulus of 1 GPa or more.

In the sound insulation structure of the configuration, the plate material has a surface density of 1 kg/m² or more and 20 kg/m² or less.

Advantageous Effects of Invention

According to the present invention, a sound insulation sheet and a sound insulation structure which not only are relatively light in weight, but also are excellent in insulation performance of sound particularly in a low frequency band, can be each formed in a compact size.

Specifically, it is essential for an increase in sound insulation effect in a low frequency band to enlarge columnar protrusions and/or introduce weights into the protrusions for making such protrusions heavier, as described above, namely, to increase the weight of a moiety functioning as a dynamic vibration absorber. Even if increases in weights of protrusions in a conventional sound insulation member are tried, this sound insulation member has been difficult to downsize.

On the contrary, the sound insulation sheet of the present invention, in which a linear convex portion is provided on a substrate and a plurality of such convex portions are placed in rows arrayed thereon, is thus increased in weight of a moiety functioning as a dynamic vibration absorber, as a whole, without any increase in height of a portion protruded on the substrate. The material forming the substrate, here used, is a material higher in rigidity than that of a conventional sound insulation member, and therefore a sound insulation sheet excellent in sound insulation performance in a low frequency band is configured in a compact manner without any increase in size of the entire thereof.

The linear convex portions placed on the substrate in rows are disposed across opposite ends of the substrate. It is presumed that such a placement not only suppresses vertical vibration of the substrate in incidence of sound, but also certainly inhibits vibration in a direction intersecting the linear convex portions, and furthermore local rigidity-mass is imparted by arrangement of the linear convex portions to thereby allow the sound insulation sheet to be enhanced in sound insulation strength in a low frequency band, as compared with a conventional sound insulation member where protrusions are arranged in two directions.

According to the method for manufacturing a sound insulation sheet of the present invention, not only a mold having concave grooves, where a surface is depressed corresponding to the outer shape of convex portions, is used to allow a resin to flow along with the concave grooves to hardly result in incorporation of bubbles in molding, but also a roll-shaped mold can be used and a long sheet-shaped substrate can be used to thereby allow a sound insulation sheet member to be continuously formed in a so-called roll-to-roll manner.

According to the present invention, even when a sound insulation sheet is attached to a material relatively high in surface density, such as a steel plate, a sound insulation structure excellent in sound insulation effect, in particular, sound insulation performance in a low frequency band, can be provided.

BRIEF DESCRIPTION OF DRAWINGS

FIG. 18 is a table summarizing the results in Examples 1 to 6 and Comparative Examples 1 to 3.

FIG. 19 is a table summarizing the results in Examples 7 to 11 and Comparative Examples 4 to 5.

FIG. 21 is a table summarizing the results in Example 12 and Example 13.

DESCRIPTION OF EMBODIMENTS

Figure 1:
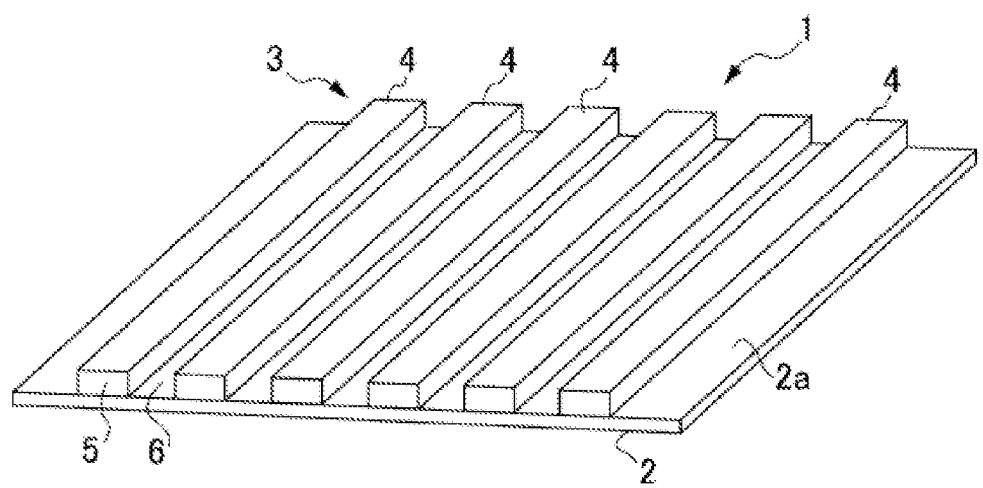
FIG. 1 is a schematic perspective view of one embodiment of the sound insulation sheet of the present invention.

Hereinafter, each embodiment of the present invention is described with reference to the drawings.

The following embodiments are illustrative for describing the present invention, and the present invention is not intended to be limited to only such embodiments. Hereinafter, positional relationships, such as top and bottom or right and left, are based on positional relationships illustrated in the drawings, unless otherwise noted. Furthermore, dimensional ratios in the drawings are not limited to ratios illustrated. For example, the designation of a numerical value range of "from 1 to 100" or "1 to 100" herein includes both the lower limit value "1" and the upper limit value "100". Much the same is true on the designations of other numerical value ranges.

The sound insulation sheet of the present invention is a sound insulation sheet including a sheet-shaped substrate and a concavo-convex structure placed on at least one surface of the substrate, in which the concavo-convex structure is formed by repeatedly arranging a concavo-convex unit shape including a convex portion linearly protruded from a sheet surface of the substrate and a concave portion along with the convex portion, in one direction on the sheet surface.

Figure 2:
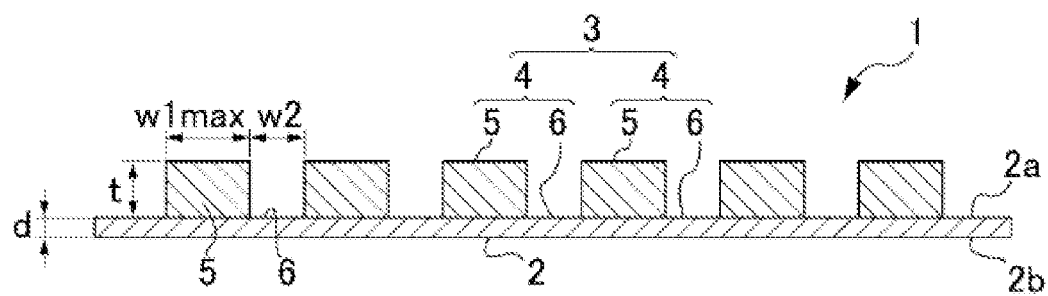
FIG. 2 is a schematic transverse sectional view of the sound insulation sheet of FIG. 1.
Figure 3:
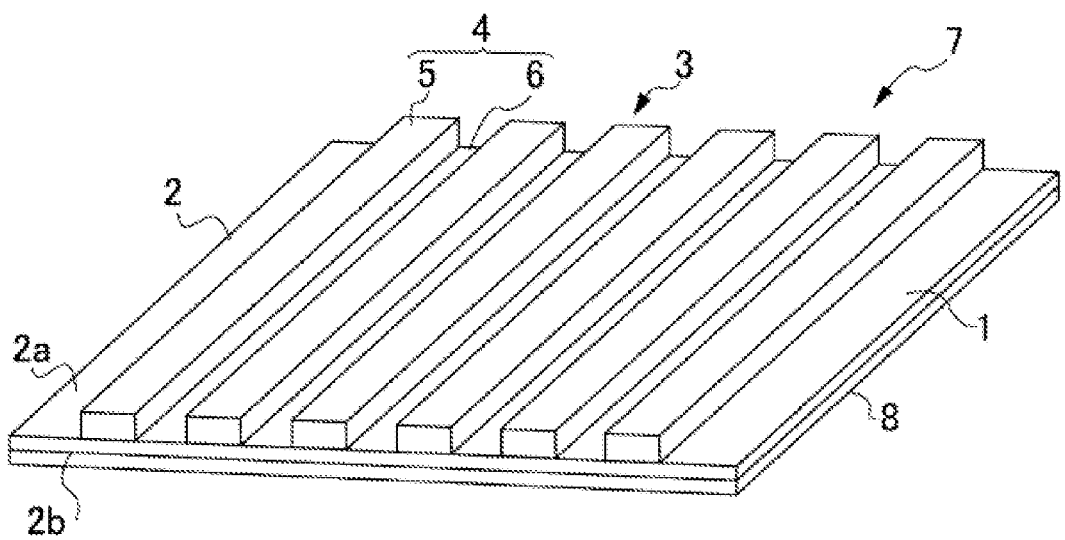
FIG. 3 is a schematic perspective view of one embodiment of the sound insulation structure of the present invention.

FIG. 1 and FIG. 2 are respectively a schematic perspective view and a schematic transverse sectional view of one embodiment of the sound insulation sheet of the present invention, and FIG. 3 is a schematic perspective view of the sound insulation structure of the present invention.

A sound insulation sheet 1 according to a mode illustrated is formed in a shape where a concavo-convex structure 3 obtained by arraying on one surface 2a of a sheet-shaped substrate 2, a plurality of convex portions 5 linearly extending along with opposite longer sides of the substrate 2.

The concavo-convex structure 3 is obtained by defining each of the convex portions 5 linearly extending on a surface of the substrate 2 and each concave portion 6 as a flat section adjacent to such each convex portions 5 as one concavo-convex unit shape 4, and repeatedly arranging a plurality of such concavo-convex unit shapes between opposite shorter sides of the substrate 2. In the present mode, six such concavo-convex unit shapes 4 are arranged to thereby form the concavo-convex structure 3.

A sound insulation structure 7 is configured by supporting other surface 2b of the substrate 2 of the sound insulation sheet 1 by a support 8, in which no concavo-convex structure 3 is provided.

[Substrate]

The substrate 2 is used for supporting the convex portions 5. A plurality of the convex portions 5 can be provided on the sheet-shaped substrate 2, to thereby provide convex portions and concave portions, resulting in formation of the concavo-convex structure 3.

The material constituting the substrate 2 is not particularly limited as long as it can support the concavo-convex structure 3, and one higher in rigidity than the resin for use in formation of the concavo-convex structure 3 is preferably used from the viewpoints of suppression of vibration of the substrate 2 by itself and supporting of the plurality of convex portions 5.

Specifically, the substrate 2 preferably has a Young's modulus of 1 GPa or more, more preferably 1.5 GPa or more. The upper limit is not particularly set, and is, for example, 1000 GPa or less.

When the substrate 2 is disposed directly on, for example, an apparatus or a structure, a surface (member) on which the substrate 2 is to be directly disposed appropriately has a surface density of 20 $kg/m^2$ or less, preferably 10 $kg/m^2$ or less, further preferably 5 $kg/m^2$ or less, for example, from the viewpoint of supporting of the substrate 2 and from the viewpoint of an enhancement in sound insulation performance.

Specific examples of the material constituting the substrate 2 include organic materials such as polyacrylonitrile, polyethylene terephthalate, polybutylene terephthalate, polyethylene naphthalate, polyvinyl chloride, polyvinylidene chloride, polychlorotrifluoroethylene, polyethylene, polypropylene, polystyrene, cyclic polyolefin, polynorbornene, polyether sulfone, polyether ether ketone, polyphenylene sulfide, polyarylate, polycarbonate, polyamide, polyimide, triacetylcellulose, polystyrene, an epoxy resin, an acrylic resin, and an oxazine resin, and any composite material where a metal such as aluminum, stainless steel, iron, copper, zinc or brass, and/or inorganic glass, an inorganic particle and/or a fiber is/are included in such an organic material, but are not particularly limited. In particular, polyethylene terephthalate is preferable from the viewpoints of, for example, sound insulation ability, rigidity, moldability and cost.

The thickness (d) of the substrate 2 is preferably 30 μm to 500 μm, more preferably 40 μm to 400 μm, further preferably 45 μm to 300 μm. When the thickness of the substrate 2 is 30 μm or more, handleability is excellent, and when the thickness is 500 μm or less, an enhancement in sound insulation performance due to providing of the convex portions 5 is achieved.

The shape of the substrate 2 is not limited to any aspects illustrated in FIG. 1 to FIG. 3. The shape can be appropriately set depending on a surface of the sound insulation sheet 1, onto which the substrate is to be disposed. For example, the shape may be a flat sheet shape, a curved sheet shape, or a special shape which is processed so as to have, for example, a curved surface portion or a bent portion. Furthermore, for example, a cut or punched portion may also be provided at any position of the substrate 2 from the viewpoint of, for example, a decrease in weight.

When the substrate 2 is bonded to other member and used, the surfaces 2a and 2b of the substrate 2 may have, for example, a pressure-sensitive adhesion layer therein. One or more surfaces of the substrate 2 may have, for example, a pressure-sensitive adhesion layer therein, without particularly limitations.

The substrate 2, which is bonded to other member, may also be used as the sound insulation sheet 1. When bonded to other member and used, the substrate 2 may have, for example, a pressure-sensitive adhesion layer in the surface 2b thereof. Such a surface which has, for example, a pressure-sensitive adhesion layer therein is not particularly limited, and one or more surfaces of the substrates 2 may have, for example, a pressure-sensitive adhesion layer therein. A surface (member) on which the substrate 2 is to be disposed appropriately has a surface density of 1 kg/m$^2$ or more and 20 kg/m$^2$ or less, for example, from the viewpoint of supporting of the substrate 2 and from the viewpoint of an enhancement in sound insulation performance. As described below, when the substrate 2 is bonded directly to other member, such other member (support) preferably has a surface density of 2.0 kg/m$^2$ or less.

[Concavo-Convex Structure]

The convex portions 5 constituting the concavo-convex structure 3 serve to impart local rigidity and mass to the substrate 2. Such local rigidity and mass are imparted to thereby allow for exertion of a function which locally suppresses vibration of the substrate 2 in incidence of a sound wave from a noise source to result in a reduction in vibration of the entire substrate 2.

A mechanism of sound insulation with a sound insulation sheet having a plurality of cylindrical protrusions, as described in Patent Literature 4, has been considered to be due to "protrusion vibration" where each convex portion vibrates and thus acts as a dynamic vibration absorber.

The present inventors have found that not only the action as the "protrusion vibration", but also an action due to "local rigidity-mass impartment" functions as a mechanism of sound insulation. Protrusions function in such actions so as to restrict vibration of a substrate. In other words, a substrate vibrates in incidence of sound into the substrate, but the protrusions impart local rigidity-mass to the substrate and thus function so as to suppress such vibration, and therefore can exert the sound insulation effect. Such "local rigidity-mass impartment" is effectively generated to thereby allow an action of insulation of sound in a low frequency band to be exerted.

It can be here easily presumed that cylindrical protrusions are, of course, not limited to cylinders and even dot-shaped protrusions can allow the "local rigidity-mass impartment" action to be effectively generated depending on the thickness of the substrate, the mass of such protrusions, and the like, and in this case, relatively large protrusions, in particular, those large in height tend to be required to be used in order to impart rigidity and mass.

The present invention, in which a plurality of protrusions are linearly provided on a substrate, can thus allow "local rigidity-mass impartment" to be effectively generated even without use of large protrusions, namely, without any increases in heights of such protrusions or any increases in weights of such protrusions.

A mechanism presumed is as follows.

In other words, the convex portions 5 of the concavo-convex structure 3 of the sound insulation sheet 1 of the present invention each have a linear shape and thus have a longitudinal direction and a transverse direction. A plurality of the convex portions 5 are arranged in parallel so as to allow respective longitudinal directions to be opposite on the sheet surface 2a of the substrate 2.

While vibration of the sheet due to incidence of sound can be modeled to, for example, a wave along with the longitudinal direction and a wave along with the transverse direction, the wave along with the longitudinal direction is restricted by the longitudinal direction of the convex portions 5 and the wave along with the transverse direction is restricted by "local rigidity-mass impartment" of the convex portions 5.

The "local rigidity-mass impartment" here can impart a mass larger than "local rigidity-mass impartment" by cylindrical protrusions because the convex portions 5 being protrusions are linear, and can allow vibration of the sheet to be more effectively restricted. Thus, protrusions (convex portions 5) are not required to be increased in height, and a thin sound insulation sheet 1 excellent in sound insulation capability can be realized.

Figure 4:
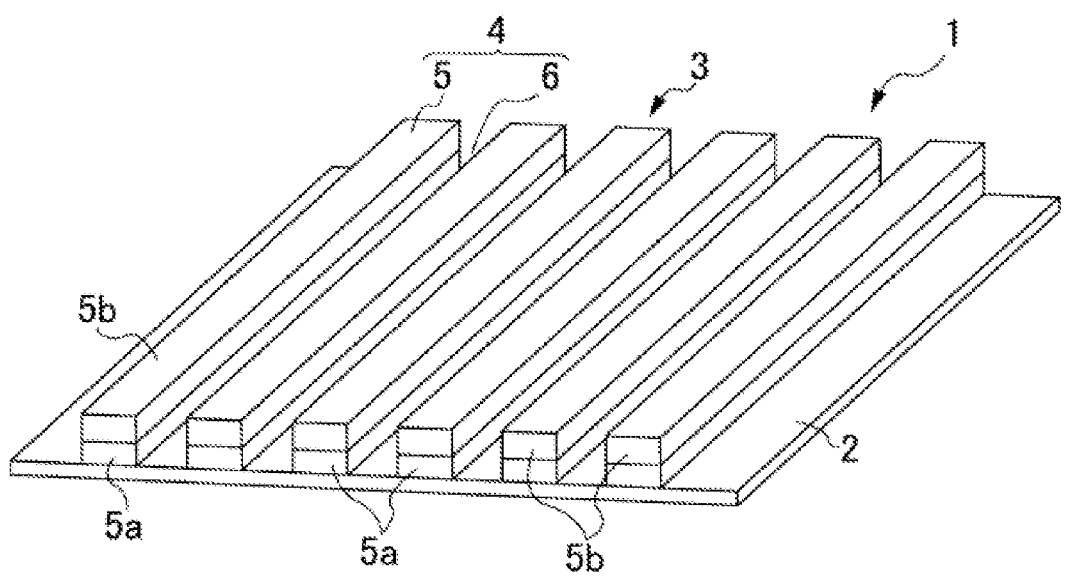
FIG. 4 is a schematic perspective view of another embodiment of the sound insulation sheet of the present invention.
Figure 5:
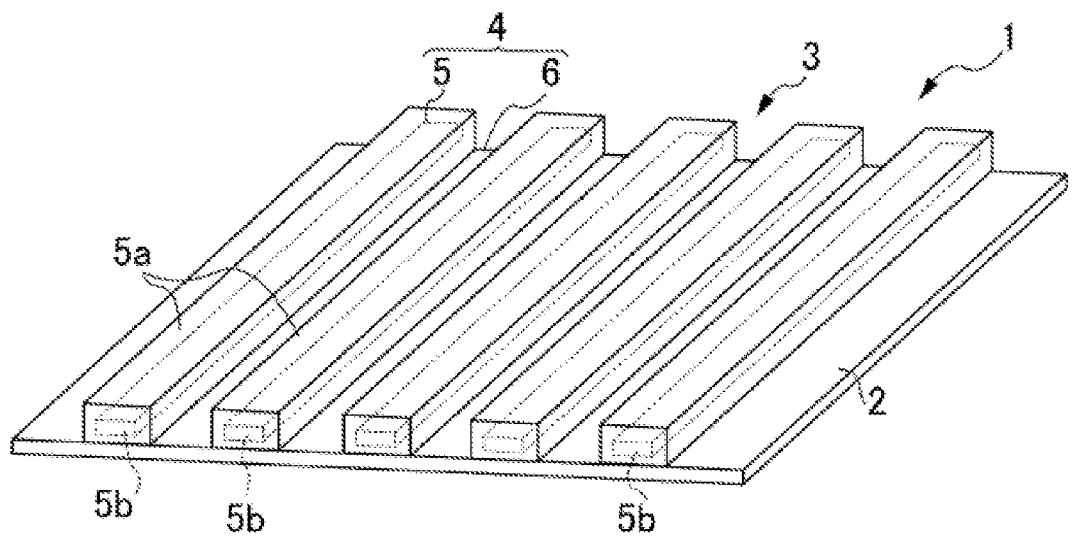
FIG. 5 is a schematic perspective view of another embodiment of the sound insulation sheet of the present invention.

The convex portions 5 may be each configured from a single structure as illustrated in FIG. 1 to FIG. 3, or may be configured from a composite structure as illustrated in FIG. 4, the composite structure including a base 5a protruded at an appropriate height and a weight part 5b which is supported at an upper end of the base 5a and which has a larger mass than the base 5a. Furthermore, the convex portions 5 may also be each configured from a composite structure where the weight part 5b is embedded into the base 5a, as illustrated in FIG. 5. Such a composite structure allows the convex portions 5 to be increased in local rigidity and mass, resulting in an enhancement in sound insulation ability in a low frequency band, of the sound insulation sheet 1. The convex portions 5 may be each a porous article having pores (gas such as air) as long as no sound insulation ability is deteriorated.

The convex portion 5 may each have a discontinuous structure appropriately disconnected on the way in the longitudinal direction. A plurality of the convex portions 5 are arranged in parallel, but are not limited only to such a parallel arrangement, and the convex portions 5 may each have an appropriate angle to such an extent not as to be overlapped.

Figure 6:
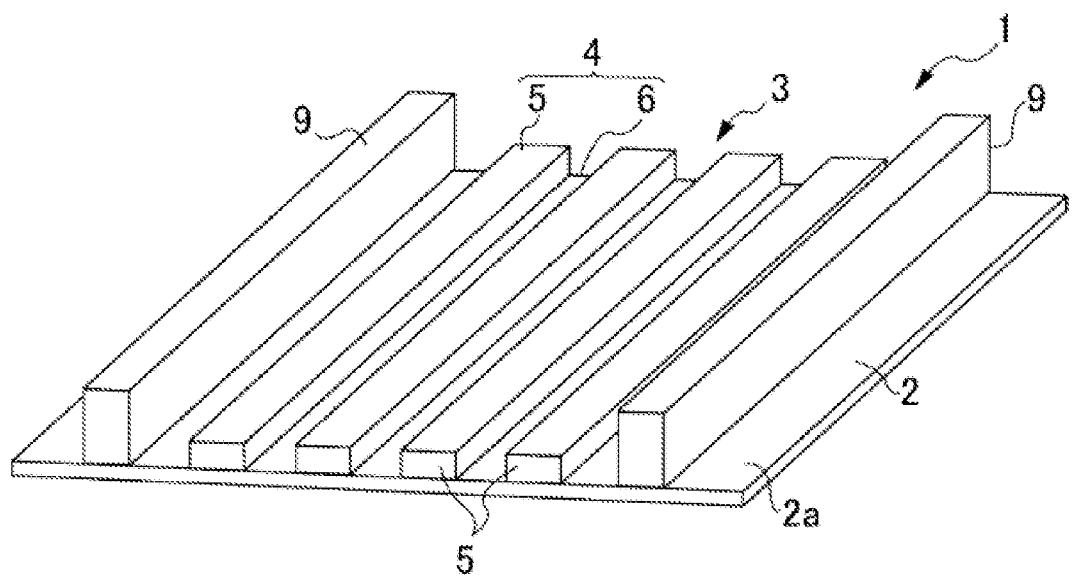
FIG. 6 is a schematic perspective view of another embodiment of the sound insulation sheet of the present invention.

The concavo-convex structure 3 may have a configuration where each rib-shaped protrusion 9 is provided on the surface 2a of the substrate 2 of the sound insulation sheet 1, as illustrated in FIG. 6.

Such rib-shaped protrusions 9, which are in the form of a pair thereof, are placed on edge sections on opposite transverse sides on the substrate 2 with the convex portions 5 being sandwiched therebetween. Both the rib-shaped protrusions 9, upper surfaces of which are provided in parallel with the surface 2a, are provided in the state of being elongated rectangular plates in parallel with the convex portions 5. The rib-shaped protrusion 9 each have a maximum height higher than those of the convex portions 5, against the normal direction of the substrate 2.

When the substrate 2 is manufactured, for example, in a so-called roll-to-roll manner where the concavo-convex structure 3 is cut out from a long sheet material provided on one surface of the substrate 2, the axial direction (longitudinal direction) of the rib-shaped protrusions 9 is defined as the longer direction (sheet flow direction) of the sheet material to thereby allow the rib-shaped protrusions 9 to function as spacers even in winding of the sound insulation sheet 1 in a sheet shape or stacking of a plurality of the sound insulation sheets, resulting in suppression of contact of the convex portions 5 with a rear surface of the substrate 2 stacked. The rib-shaped protrusions 9 are provided to thereby hardly cause manufacturing troubles such as deformation, cracking, dropping and breaking of the convex portions 5, and thus the sound insulation sheet 1 is easily manufactured and stored in a so-called roll-to-roll manner.

The concavo-convex structure 3 may be formed by formation with deformation of the substrate 2, or may be formed by obtaining the convex portions 5 with a different material from that of the substrate 2 and integrally forming the convex portions and the substrate 2. The concavo-convex structure 3 may be formed on one surface or a plurality of surfaces of the substrate 2. When the sound insulation structure 7 is configured by supporting the sound insulation sheet 1 by the support 8, the support 8 is disposed on a surface 2b with no concavo-convex structure 3 provided thereon, of the substrate 2.

The shape of each cross section perpendicular to the arrangement direction of the convex portions 5, namely, the shape of each transverse section of the convex portions 5, here adopted, can be substantially, for example, a square, a rectangular shape, a trapezoidal shape, a semicircular shape or an oval shape. The shape of each cross section of the convex portions 5 can be appropriately selected depending on the application from the viewpoints of, for example, sound insulation performance, production cost and handleability.

The maximum width of a cross section perpendicular to the arrangement direction of the concavo-convex unit shape 4, the namely, the maximum width (w1max) of each transverse section of the convex portions 5 is preferably 0.5 mm or more and 10 mm or less, more preferably 0.7 mm or more and 8 mm or less, further preferably 1 mm or more and 6 mm or less.

The above range can allow for formation of a sound insulation sheet 1 which is not only thin and light in weight, but also excellent in sound insulation performance in a low frequency band.

The height of the concavo-convex unit shape 4, namely, the height (t) of each of the convex portions 5 is preferably 0.5 mm or more and 10 mm or less, more preferably 0.7 mm or more and 8 mm or less, further preferably 1 mm or more and 6 mm or less. The above range can allow for formation of a sound insulation sheet 1 which is not only thin and light in weight, but also excellent in sound insulation performance in a low frequency band.

The interval in the concavo-convex unit shape 4, namely, the width (w2) of such each concave portion 6 is preferably 3 mm or more and 100 mm or less, more preferably 4 mm or more and 80 mm or less, further preferably 5 mm or more and 50 mm or less. The above range can allow for formation of a sound insulation sheet 1 which is not only thin and light in weight, but also excellent in sound insulation performance in a low frequency band.

The concavo-convex structure 3 is preferably formed so that, when the specific gravity of such each convex portion 5 is designated as sg, the maximum width w1max (mm) of the transverse section of such each convex portion 5, the height t (mm) of such each convex portion 5, and the width w2 (mm) of such each concave portion 6 are within the ranges defined by expressions (I) and (II):

$$0.1 \leq w1\max \times t \times sg/w2 \leq 10 \quad \text{Expression (I)}$$

$$5 \leq w1\max \times t \leq 50 \quad \text{Expression (II)}$$

Optimal values in a configuration of the concavo-convex unit shape 4 which provides high sound insulation performance, while varied, in production of the sound insulation sheet 1, depending on, for example, a relationship with the thickness (d) of the substrate 2 or each size of the convex portions 5 and the concave portions 6 as described above, can be within the expression (I) defined about the surface density of the concavo-convex unit shape 4 and the expression (II) defined about the cross section area of each of the convex portions 5 to thereby allow the sound insulation sheet 1 to exert favorable sound insulation effect. Any smaller value than the lower limit values defined by both the expressions causes deterioration in sound insulation strength, and any larger value than the upper limit values imparts no sound insulation performance in a low frequency band.

The weight ratio of the convex portions 5 to the substrate 2, represented by (Weight of convex portions/Weight of substrate), is preferably in the range from 1.8 to 15.1, further preferably 0.5 to 30, further preferably 1.0 to 20. The weight ratio of the convex portions 5 to the substrate 2 can be within the range to thereby allow the convex portions 5 to more effectively function as "local rigidity-mass" against vibration of the substrate 2, resulting in an effective enhancement in sound insulation strength in a low frequency band.

The area ratio of the convex portions 5 and the concave portions 6, represented by (Area of convex portions/Area of concave portions), is preferably in the range from 0.1 to 3, further preferably 0.15 to 2, further preferably 0.2 to 1.5. The area ratio can be within the range to thereby allow the convex portions 5 to more effectively function as "local rigidity-mass" against vibration of the substrate 2, resulting in an effective enhancement in sound insulation strength in a low frequency band.

Figure 7:
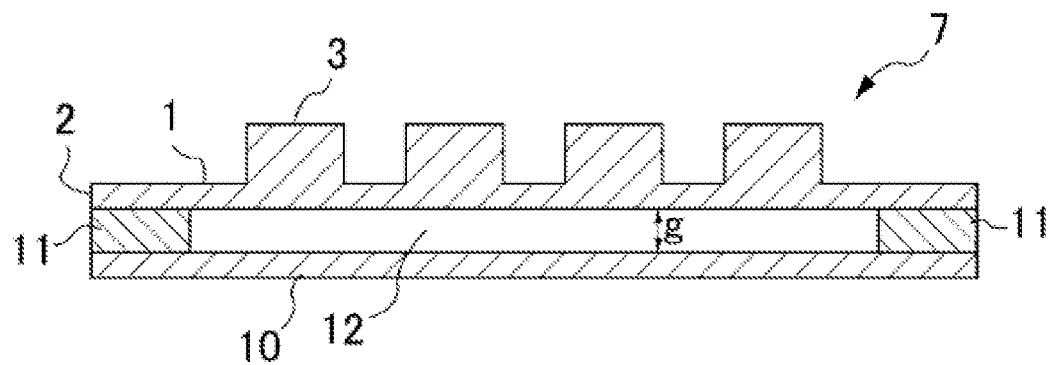
FIG. 7 is a schematic cross-sectional view of another embodiment of the sound insulation structure of the present invention.

FIG. 7 illustrates a schematic cross section of another embodiment of the sound insulation structure of the present invention.

As illustrated in the Figure, a sound insulation structure 7 according to this mode includes a sound insulation sheet 1 having a concavo-convex structure 3 on one surface of a substrate 2, and a plate material 10 including, for example, a steel plate forming an exterior plate of equipment.

Figure 11:
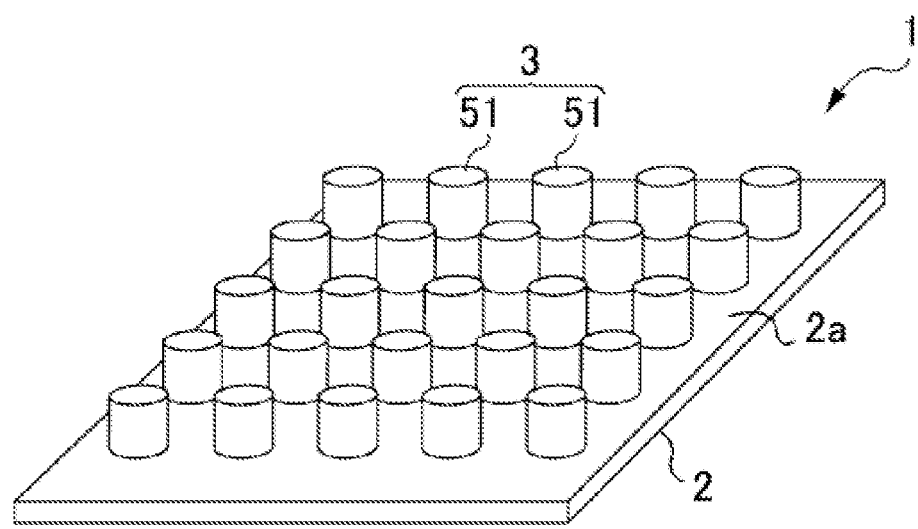
FIG. 11 is a schematic perspective view of still another embodiment of a sound insulation sheet.

As described above, the substrate 2 is a sheet-shaped member, and is provided with the concavo-convex structure 3 on one surface or on both front and rear surface thereof. The concavo-convex structure 3 may be a linear structure as illustrated in FIG. 1 to FIG. 6, or may be a dot-shaped structure as illustrated in FIG. 11.

The sound insulation sheet 1 is provided opposite to the plate material 10 with a space section being interposed. A retention unit 11 is provided between the sound insulation sheet 1 and the plate material 10. The retention unit 11, which is in a frame shape, is provided on the plate material 10, and a space section 12 is formed between the sound insulation sheet 1 and the plate material 10 by the retention unit 11.

The concavo-convex structure 3 may be provided toward the space section 12, or may be provided opposite to the space section 12 as in FIG. 7.

It has been confirmed from experiments by the present inventors that, when the sound insulation structure 7 illustrated and a structure of an aspect where a polyethylene resin sheet whose mass is the same as the mass added of the sound insulation sheet 1 and the retention unit 11 is integrally bonded to a surface of the plate material 10 are compared in measurement of sound insulation performance, the sound insulation structure 7 having the space section 12 exhibits a sound insulation performance enhanced by 5 to 10 dB.

Thus, the space section 12 is provided between the sound insulation sheet 1 and the plate material 10 to thereby allow the additive law to be satisfied, resulting in exertion of the sound insulation effect. When the sound insulation sheet 1 is bonded to the plate material 10, the sound insulation effect is not sufficient. The concavo-convex structure 3 not only serves as a dynamic vibration absorber, but also has a function of suppressing substrate vibration due to impartment of local rigidity-mass, and the function exerts the sound insulation effect. It is considered that the sound insulation sheet 1 is bonded to the plate material 10 to result in a relative increase in substrate weight not to thereby sufficiently exert the effect due to local rigidity-mass.

Figure 8:
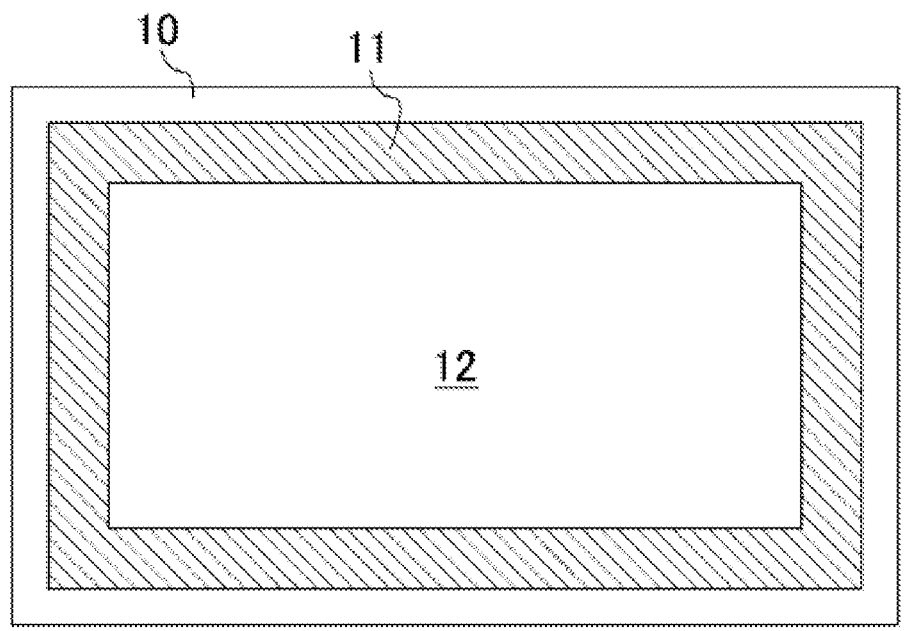
FIG. 8 is a configuration view of the sound insulation structure in FIG. 7, where the sound insulation sheet in the Figure is not placed, when viewed from upside.

FIG. 8 is a view when a configuration of the sound insulation structure 7 in FIG. 7, where no sound insulation sheet 1 is placed, is viewed from upside. As illustrated in the Figure, the space section 12 between the sound insulation sheet 1 and the plate material 10 is preferably a space sealed as much as possible in order to prevent sound leakage. The retention unit 11 can be a continuous frame-shaped member to thereby allow the space section 12 to be a space sealed.

As the degree of sealing of the space section 12 is higher, sound leakage to the environment can be decreased. The sound occurring by beating to the plate material 10 vibrates the plate material 10. The vibration is transmitted to the substrate 2 of the sound insulation sheet 1 via the space section 12. It is considered that the concavo-convex structure 3 inhibits vibration of the substrate 2 by impartment of local rigidity-mass to thereby exert the sound insulation effect. It is considered that vibration of the plate material 10 is transmitted to the sound insulation sheet 1 due to no sound leakage and thus sound insulation can be effectively made.

It has been confirmed from experiments by the present inventors that, when the sound insulation structure 7 illustrated and a sound insulation structure having, in place of the sound insulation sheet 1 of the sound insulation sheet 7, a planar sheet member having the same mass are compared in measurement of sound insulation performance, the sound insulation structure using the sound insulation sheet 1 exhibits a sound insulation performance enhanced by 10 dB or more.

It is known that in general, when two sheet members are stacked to form a space section sealed, an air space in the space section vibrates to thereby cause a resonance phenomenon (resonance transmission phenomenon) as in a drum, resulting in deterioration in sound insulation performance at a specific frequency, in particular, in a low frequency band. In the present invention, the sound insulation sheet 1 can be used to thereby allow a function of suppressing substrate vibration due to impartment of local rigidity-mass from the concavo-convex structure 3 to be exerted, resulting in an enhancement in sound insulation performance.

The interval (g) in the space section 12 causes no problem as long as the sound insulation sheet 1 and the plate material 10 are not contacted, and is preferably 0.1 mm or more and 50 mm or less, more preferably 0.5 mm or more and 40 mm or less.

Figure 9:
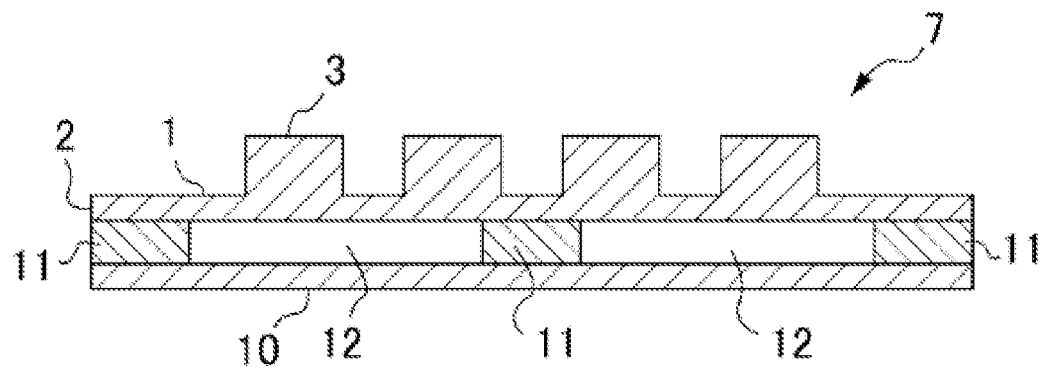
FIG. 9 is a schematic cross-sectional view of another mode of the sound insulation structure of the present invention.

FIG. 9 illustrates an example where the retention unit 11 is further provided in the space section 12.

The retention unit 11 is not only placed along with the peripheral edge sections of the sound insulation sheet 1 and the plate material 10, as illustrated in FIG. 7 and FIG. 8, but also placed in the space section 12, as illustrated in FIG. 9. Such a placement provides the effect of preventing the sound insulation sheet 1 from being dropped toward the plate material 10 to result in an enhancement in strength.

Figure 10:
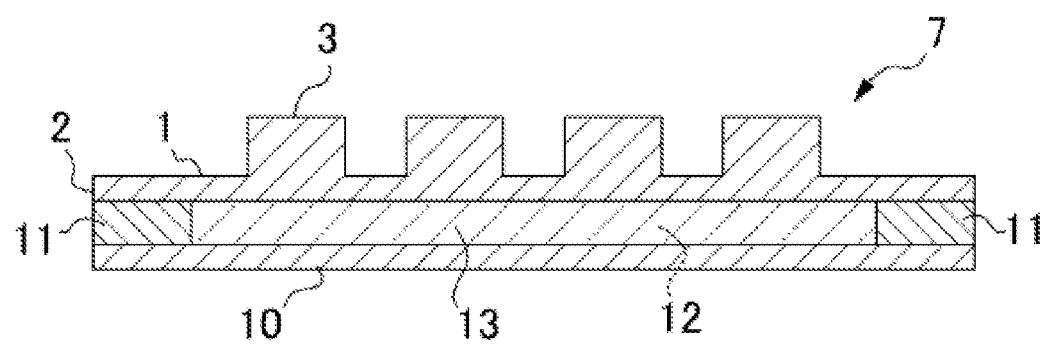
FIG. 10 is a schematic cross-sectional view of another mode of the sound insulation structure of the present invention.

FIG. 10 illustrates an example where a sound absorbing material 13 is packed in the space section 12.

The sound insulation structure 7 can also be configured by packing the sound absorbing material 13 in the space section 12, as illustrated in FIG. 10. The sound absorbing material 13 is provided between the sound insulation sheet 1 and the plate material 10, and the sound insulation sheet 1 and the plate material 10 are opposite with the sound absorbing material 13 being interposed therebetween.

The sound absorbing material 13 may be fully packed in the space section 12 as illustrated in the Figure, or may be discretely packed with an air space having an appropriate width being interposed.

The sound absorbing material 13, or the sound absorbing material 13 and such an air space can also be interposed between the sound insulation sheet 1 and the plate material 10 to thereby hardly propagate vibration of the plate material 10 directly to the sound insulation sheet 1, thereby providing favorable sound insulation performance.

Even when the sound absorbing material 13 is provided, the concavo-convex structure 3 may be provided toward the space section 12 (toward the sound absorbing material 13), or may be provided opposite to the space section 12 (the sound absorbing material 13).

[Sound Insulation Sheet]

Figure 12:
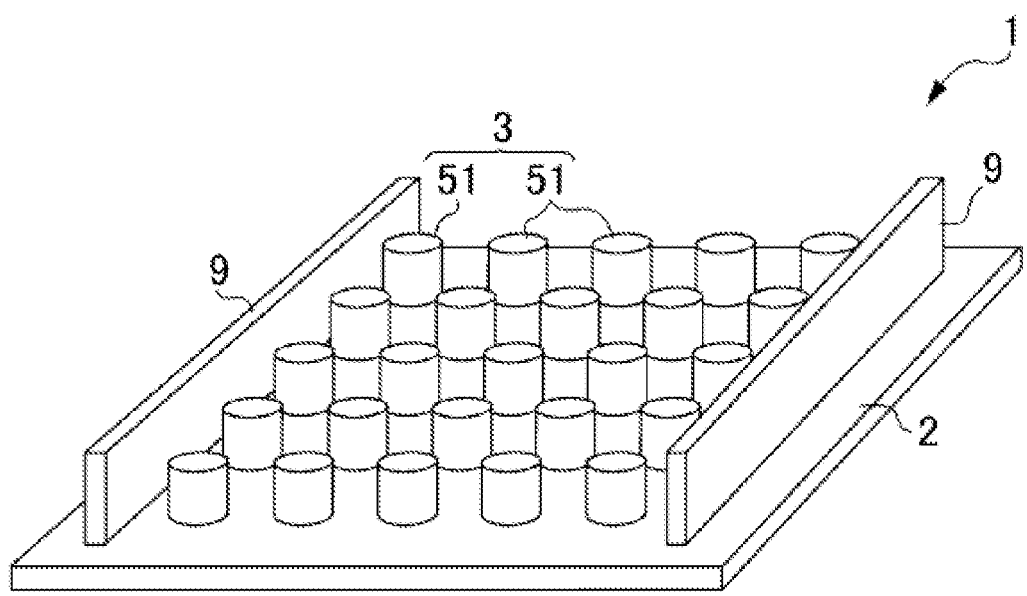
FIG. 12 is a schematic perspective view of still another embodiment of a sound insulation sheet.
Figure 13:
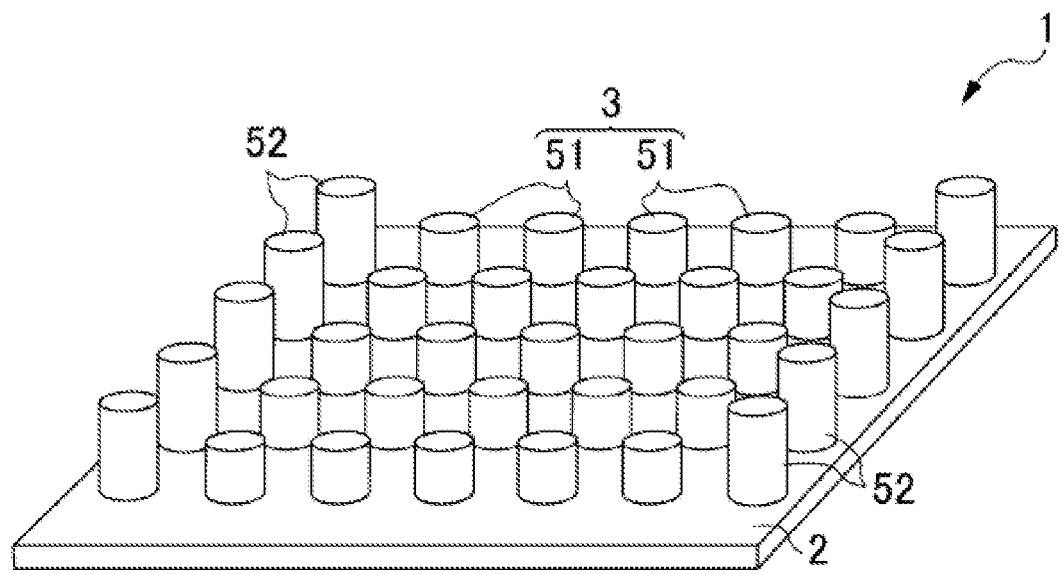
FIG. 13 is a schematic perspective view of still another embodiment of a sound insulation sheet.

The sound insulation sheet 1 constituting the sound insulation structure 7, here used, can be one having any linear concavo-convex structure 3 as illustrated in FIG. 1 to FIG. 6, or any concavo-convex structure 3 having a dot-shaped convex portion, as illustrated in FIG. 11 to FIG. 13.

The sound insulation sheet 1 illustrated in FIG. 11 to FIG. 13 has a concavo-convex structure 3 where a plurality of dot-shaped convex portions (hereinafter, also referred to as "protrusion".) 51 defined as a concavo-convex unit shape 4 are aligned vertically and laterally on one surface 2a of the sheet-shaped substrate 2 at predetermined intervals.

[Concavo-Convex Structure]

Such protrusions 51 constituting the concavo-convex structure 3 play a role of a resonance part. The resonance part functions as a vibrator (dynamic vibration absorber) which vibrates at a certain frequency in incidence of a sound wave from a noise source. The resonance part can be provided to result in an increase in effective mass in incidence of a sound wave from a noise source, thereby providing high sound insulation performance outstripping the mass law.

The protrusions 51 may be each configured from a single structure as illustrated in FIG. 11, or may be configured from a composite structure including a weight part not illustrated, as long as there is caused no problem about molding by placement of the weight part. When the concavo-convex structure 3 acts as the resonance part in such a composite structure, the protrusions 51 effectively function as a dynamic vibration absorber having a resonant frequency determined by the mass of the weight part functioning as a weight and the spring constant of a base functioning as a spring. The protrusions 51 may be each a porous article.

As illustrated in FIG. 12, a configuration may also be adopted where the rib-shaped protrusions 9 are provided on the surface 2a of the substrate 2 of the sound insulation sheet 1. The rib-shaped protrusions 9 are not each limited to be configured in a rectangular plate shape. For example, as illustrated in FIG. 13, such rib-shaped protrusions may be cylindrical rib-shaped protrusions 52 which are formed into substantially cylindrical shapes and which are plurally placed at intervals along with a second direction so as to form rows on both edge sections in a first direction. This configuration is adopted to thereby not only obtain the same action/effect as in the rectangular plate-shaped rib-shaped protrusions 9 illustrated in FIG. 12, but also result in an enhancement in followability (flexibility) of the sound insulation sheet 1 by placement of a plurality of the rib-shaped protrusions 52 at intervals. Thus, even in the case of a bonding surface having a more complicated shape, an extensible and flexible substrate 2 can follow such a surface shape, resulting in stable attachment of the substrate 2 to a surface of the plate material 10 with the retention unit 11 being interposed.

The concavo-convex structure 3 has each protrusion 51 as a concavo-convex unit shape, and such each protrusion 51 is repeatedly arranged in at least two different directions along with the surface 2a of the substrate 2, the surface being located toward the concavo-convex structure 3. In FIG. 11 to FIG. 13, such protrusions 51 are arranged along with an orthogonal side of the substrate 2 having a rectangular shape in a planar view. Such protrusions 51 each have substantially, for example, a cylindrical shape, a prismatic shape, a conical shape, a truncated conical shape, a pyramid shape, a truncated pyramid shape, a semispherical shape or an ellipsoidal shape, and such a shape can be appropriately selected depending on the application from the viewpoints of, for example, sound insulation performance, production cost and handleability.

The ratio of the area of such protrusions 51 to the area of the surface 2a of the substrate 2, the surface being located toward the concavo-convex structure 3, in the concavo-convex structure 3 is preferably 5% to 80% (5% or more and 80% or less), more preferably 5.5% to 70% (5.5% or more and 70% or less), further preferably 6% to 60% (6% or more and 60% or less). When the ratio is within the range, sound insulation ability due to vibration of the substrate 2 is exhibited to result in a dramatic enhancement in sound insulation ability. The area of such protrusions 51 means the cross section area of such protrusions 51 at locations (bases) where such protrusions are in contact with the surface 2a of the substrate 2.

The mass per such each protrusion 51 (per unit) in the concavo-convex structure 3 is 20 mg or more and 900 mg or less, and the ratio (packing rate) of the area of such protrusions 51 to the area of the surface 2a is within the above range. Such each protrusion 51 is increased in effective mass in incidence of a sound wave from a noise source, and not only functions as a vibrator (dynamic vibration absorber) vibrating at a certain frequency, but also serves as a weight for membrane vibration of the substrate 2.

Membrane vibration which allows the substrate 2 to vibrate is generated in incidence of a sound wave from a noise source. Such each protrusion 51 acts as a local weight and thus inhibits the membrane vibration. As a result, the sound insulation effect is enhanced as compared with a case where such each protrusion 51 only functions as a dynamic vibration absorber.

The mass per unit shape of such each protrusion 51 is preferably 20 mg to 900 mg, more preferably 22 mg to 700 mg, further preferably 24 mg to 600 mg, particularly preferably 25 mg to 500 mg, as described above. When the mass per unit shape of such each protrusion 51 is 20 mg to 900 mg, the synergistic effect between sound insulation ability due to "protrusion vibration" and sound insulation ability due to "local rigidity-mass impartment", of the concavo-convex unit shape, results in a dramatic enhancement in sound insulation performance.

The maximum width in the cross section parallel with the surface 2a (hereinafter, simply referred to as "maximum width".), namely, the diameter in the case of such each protrusion 51 being cylindrical shape, or the maximum crossing width in the case of such each protrusion 51 having a prismatic shape, of the protrusions 51 is preferably 0.5 mm to 50 mm, more preferably 1.0 mm to 30 mm, further preferably 1.5 mm to 20 mm, particularly preferably 2.0 mm to 10 mm. When the maximum width of such each protrusion 51 is 0.5 mm or more, sound insulation performance is excellent, and when the maximum width is 50 mm or less, moldability and handleability are excellent.

The protrusions 51 preferably each have a height (maximum height) of 0.5 mm or more and 50 mm or less, more preferably 0.7 mm or more and 30 mm or less, further preferably 0.9 mm or more and 20 mm or less, particularly preferably 1.2 mm or more and 10 mm or less. When the height of such each protrusion 51 is 0.5 mm or more, sound insulation performance is excellent, and when the height is 50 mm or less, moldability and handleability are excellent.

The interval between the protrusions 51 is preferably 1 mm to 100 mm, more preferably 1.4 mm to 80 mm, further preferably 1.8 mm to 60 mm, particularly preferably 2 mm to 50 mm. When the interval in the concavo-convex unit shape is 1 mm or more, moldability is excellent, and when the interval is 100 mm or less, sound insulation performance is excellent. The interval in the concavo-convex unit shape means a distance (placement pitch) in connection of the center of any concavo-convex unit shape and the center of adjacent concavo-convex unit shape thereto by a straight line.

The value (Mass (mg/protrusion)/Thickness ($\mu$m) of substrate 2) of the mass per such each protrusion 51 relative to the thickness of the substrate 2 is preferably within the range from 0.4 to 4. While a low weight of such each protrusion 51 relative to the thickness of the substrate 2 mainly leads to protrusion vibration, a certain weight thereof can effectively generate "local rigidity-mass impartment", resulting in an enhancement in sound insulation effect.

The number of the protrusions 51 per unit area is 40 to $1000000/m^2$, more preferably 100 to $500000/m^2$, further preferably 300 to $100000/m^2$, particularly 500 to $30000/m^2$, preferably 1000 to $10000/m^2$. The protrusions 51 can be present at a certain number to result in effective sound insulation.

[Material for Use in Concavo-Convex Structure]

The material for use in formation of the concavo-convex structure 3 is not particularly limited in terms of the type thereof as long as the material has rubber elasticity and enables dynamic viscoelasticity to be measured, and examples include a resin and an elastomer.

Examples of the resin include a thermosetting or photo-curable resin and a thermoplastic resin, and examples of the elastomer include a thermosetting or photo-curable elastomer and a thermoplastic elastomer, and in particular, a photo-curable resin or a photo-curable elastomer is preferable, and a photo-curable resin is particularly preferable because of being good in shape transferability and exerting an excellent sound insulation function.

When a thermosetting or thermoplastic resin, or a thermosetting or thermoplastic elastomer is used as each material of the convex portions 5 or protrusions 51 (hereinafter, collectively referred to as "convex portions 5".), a curing reaction by heat is required in molding of the convex portions 5, and thus bubbles tend to occur in the convex portions 5 molded. When bubbles occur, resonance is difficult and sound insulation performance is deteriorated. When a photo-curable resin or a photo-curable elastomer is used as the material of the convex portions 5, the problem of the bubbles is not caused and thus sound insulation performance is hardly deteriorated.

Such a resin or elastomer may be used as a single material or in any combination of two or more materials at any ratio, and two or more materials are preferably combined from the viewpoint that characteristics such as storage elastic modulus and tensile elongation at break can be controlled.

Examples of the resin for use in formation of the concavo-convex structure 3 include thermosetting resins such as an unsaturated polyester resin, a phenol resin, an epoxy resin, a urethane resin and a rosin-modified maleic acid resin, photo-curable resins such as homopolymers or copolymers of monomers such as epoxy (meth)acrylate, urethane (meth) acrylate, polyester (meth)acrylate, polyether (meth)acrylate and a modified product thereof, and thermoplastic resins such as homopolymers or copolymers of vinyl monomers such as vinyl acetate, vinyl chloride, vinyl alcohol, vinyl butyral and vinyl pyrrolidone, or a saturated polyester resin, a polycarbonate resin, a polyamide resin, a polyolefin resin, a polyarylate resin, a polysulfone resin and a polyphenylene ether resin. Among them, urethane (meth)acrylate, polyester (meth)acrylate and polyether (meth)acrylate each low in elastic modulus of a cured product are preferable, and urethane (meth)acrylate is particularly preferable.

Examples of the elastomer for use in formation of the concavo-convex structure 3 include thermosetting elastomers such as elastomers based on thermosetting resins such as vulcanized rubber such as chemically crosslinked natural rubber or synthetic rubber, urethane rubber, silicone rubber, fluororubber, and acrylic rubber; thermoplastic elastomers such as an olefinic thermoplastic elastomer, a styrene-based thermoplastic elastomer, a vinyl chloride-based thermoplastic elastomer, a urethane-based thermoplastic elastomer, an ester-based thermoplastic elastomer, an amide-based thermoplastic elastomer, a silicone rubber-based thermoplastic elastomer and an acrylic thermoplastic elastomer, photo-curable elastomers such as an acrylic photo-curable elastomer, a silicone-based photo-curable elastomer and an epoxy-based photo-curable elastomer, and a silicone-based thermosetting elastomer, an acrylic thermosetting elastomer and an epoxy-based thermosetting elastomer. Among them, a silicone-based thermosetting elastomer which is a thermosetting elastomer, an acrylic thermosetting elastomer, an acrylic photo-curable elastomer which is a photo-curable elastomer, and a silicone-based photo-curable elastomer are preferable.

The photo-curable resin is a resin to be polymerized by light irradiation. Examples include a photo-radical polymerizable resin and photo-cation polymerizable resin. Among them, a photo-radical polymerizable resin is preferable. The photo-radical polymerizable resin preferably has at least one (meth)acryloyl group in its molecule. Such a photo-radical polymerizable elastomer having at least one (meth)acryloyl group in its molecule is not particularly limited, and examples include methyl (meth)acrylate, ethyl (meth)acrylate, n-propyl (meth)acrylate, i-propyl (meth)acrylate, n-butyl (meth)acrylate, i-butyl (meth)acrylate, t-butyl (meth)acrylate, 2-methylbutyl (meth)acrylate, n-pentyl (meth)acrylate, n-hexyl (meth) acrylate, n-heptyl (meth) acrylate, 2-methylhexyl (meth) acrylate, 2-ethylhexyl (meth) acrylate, 2-butylhexyl (meth)acrylate, isooctyl (meth)acrylate, isopentyl (meth)acrylate, isononyl (meth) acrylate, isodecyl (meth) acrylate, isobornyl (meth) acrylate, cyclohexyl (meth) acrylate, benzyl(meth)acrylate, phenoxy (meth)acrylate, n-nonyl (meth)acrylate, n-decyl (meth)acrylate, lauryl (meth)acrylate, hexadecyl (meth)acrylate, stearyl (meth)acrylate, morpholin-4-yl (meth) acrylate and urethane (meth)acrylate, from the viewpoint of elastic modulus of a cured product. Among them, urethane (meth)acrylate is preferable from the viewpoint of elastic modulus of a cured product.

A compound having an ethylenically unsaturated bond may be included as the resin for use in formation of the concavo-convex structure 3. Examples of the compound having an ethylenically unsaturated bond include aromatic vinyl monomers such as styrene, α-methylstyrene, α-chlorostyrene, vinyltoluene and divinylbenzene; vinyl ester monomers such as vinyl acetate, vinyl butyrate, N-vinylformamide, N-vinylacetamide, N-vinyl-2-pyrrolidone, N-vinylcaprolactam and divinyl adipate; vinyl ethers such as ethyl vinyl ether and phenyl vinyl ether; allyl compounds such as diallyl phthalate, trimethylolpropane diallyl ether and allyl glycidyl ether; (meth)acrylamides such as (meth) acrylamide, N,N-dimethyl(meth)acrylamide, N-methylol (meth)acrylamide, N-methoxymethyl(meth)acrylamide, N-butoxymethyl(meth)acrylamide, N-t-butyl(meth)acrylamide, (meth)acryloylmorpholine and methylenebis(meth) acrylamide; mono(meth)acrylates such as (meth)acrylic acid, methyl (meth)acrylate, ethyl (meth)acrylate, propyl (meth)acrylate, n-butyl (meth)acrylate, i-butyl (meth)acrylate, t-butyl (meth)acrylate, hexyl (meth)acrylate, 2-ethylhexyl (meth)acrylate, lauryl (meth)acrylate, stearyl (meth) acrylate, tetrahydrofurfuryl (meth)acrylate, morpholyl (meth)acrylate, 2-hydroxyethyl (meth) acrylate, 2-hydroxypropyl (meth) acrylate, 4-hydroxybutyl (meth) acrylate, glycidyl (meth) acrylate, dimethylaminoethyl (meth) acrylate, diethylaminoethyl (meth)acrylate, benzyl (meth)acrylate, cyclohexyl (meth) acrylate, phenoxyethyl (meth) acrylate, tricyclodecane (meth) acrylate, dicyclopentenyl (meth) acrylate, allyl (meth) acrylate, 2-ethoxyethyl (meth)acrylate, isobornyl (meth)acrylate and phenyl (meth)acrylate; polyfunctional (meth)acrylates such as ethylene glycol di(meth)acrylate, diethylene glycol di(meth)acrylate, triethylene glycol di(meth)acrylate, tetraethylene glycol di(meth) acrylate, polyethylene glycol di(meth)acrylate (number of repeating units: 5 to 14), propylene glycol di(meth)acrylate, dipropylene glycol di(meth)acrylate, tripropylene glycol di(meth)acrylate, tetrapropylene glycol di(meth)acrylate, polypropylene glycol di(meth)acrylate (number of repeating units: 5 to 14), 1,3-butylene glycol di(meth)acrylate, 1,4-butanediol di(meth)acrylate, polybutylene glycol di(meth) acrylate (number of repeating units: 3 to 16), poly(1-methylbutylene glycol) di(meth)acrylate (number of repeating units: 5 to 20), 1,6-hexane diol di(meth)acrylate, 1,9-nonanediol di(meth)acrylate, neopentyl glycol di(meth) acrylate, hydroxypivalic acid neopentyl glycol di(meth) acrylate, di(meth)acrylate of dicyclopentanediol, di(meth) acrylate of a caprolactone adduct (n+m=2 to 5) of hydroxypivalic acid neopentyl glycol, di(meth)acrylate of a γ-butyrolactone adduct (n+m=2 to 5) of hydroxypivalic acid neopentyl glycol, di(meth)acrylate of a caprolactone adduct (n+m=2 to 5) of neopentyl glycol, di(meth)acrylate of a caprolactone adduct (n+m=2 to 5) of butylene glycol, di(meth)acrylate of a caprolactone adduct (n+m=2 to 5) of cyclohexane dimethanol, di(meth)acrylate of a caprolactone adduct (n+m=2 to 5) of dicyclopentanediol, di(meth)acrylate of a caprolactone adduct (n+m=2 to 5) of bisphenol A, di(meth)acrylate of a caprolactone adduct (n+m=2 to 5) of bisphenol F, di(meth)acrylate of a bisphenol A ethylene oxide adduct (p=1 to 7), di(meth)acrylate of a bisphenol A propylene oxide adduct (p=1 to 7), di(meth)acrylate of a bisphenol F ethylene oxide adduct (p=1 to 7), di(meth) acrylate of a bisphenol F propylene oxide adduct (p=1 to 7), trimethylolpropane tri(meth)acrylate, tri(meth)acrylate of a trimethylolpropane ethylene oxide adduct (p=1 to 5), tri (meth)acrylate of a trimethylolpropane propylene oxide adduct (p=1 to 5), glycerin tri(meth)acrylate, tri(meth)acrylate of a glycerin ethylene oxide adduct (p=1 to 5), ditrimethylolpropane tetra(meth)acrylate, tetra(meth)acrylate of a ditrimethylolpropane ethylene oxide adduct (p=1 to 5), pentaerythritol tri(meth)acrylate, pentaerythritol tetra(meth)

acrylate, tri(meth)acrylate of a pentaerythritol ethylene oxide adduct (p=1 to 5), tetra(meth)acrylate of a pentaerythritol ethylene oxide adduct (p=1 to 15), tri(meth)acrylate of a pentaerythritol propylene oxide adduct (p=1 to 5), tetra (meth)acrylate of a pentaerythritol propylene oxide adduct (p=1 to 15), penta(meth)acrylate of a dipentaerythritol ethylene oxide adduct (p=1 to 5), hexa(meth)acrylate of a dipentaerythritol ethylene oxide adduct (p=1 to 15), tri (meth)acrylate of a poly(meth)acrylate pentaerythritol caprolactone (4 to 8 mol) adduct such as N,N',N"-tris((meth) acryloxy poly(p=1 to 4)(ethoxy)ethyl)isocyanurate, tetra(meth)acrylate of a pentaerythritol caprolactone (4 to 8 mol) adduct, dipentaerythritol penta(meth)acrylate, dipentaerythritol hexa(meth)acrylate, penta(meth)acrylate of a dipentaerythritol caprolactone (4 to 12 mol) adduct, hexa(meth) acrylate of a dipentaerythritol caprolactone (4 to 12 mol) adduct, N,N',N"-tris(acryloxyethyl) isocyanurate, N,N'-bis (acryloxyethyl)-N"-hydroxyethyl isocyanurate, isocyanuric acid ethylene oxide-modified (meth)acrylate, isocyanuric acid propylene oxide-modified (meth)acrylate, and isocyanuric acid ethylene oxide/propylene oxide-modified (meth) acrylate; and epoxy poly(meth)acrylates obtained by addition reaction of polyepoxy compounds each having a plurality of epoxy groups in its molecule, such as bisphenol A glycidyl ether, bisphenol F glycidyl ether, phenol novolac epoxy resin, cresol novolac epoxy resin, pentaerythritol poly glycidyl ether, trimethylolpropane triglycidyl ether, and triglycidyl tris(2-hydroxyethyl) isocyanurate, with (meth) acrylic acid. Among them, phenoxyethyl acrylate, benzyl acrylate, 2-ethylhexyl (meth)acrylate and methoxy polyethylene glycol acrylate each low in elastic modulus of a cured product are preferable, and 2-ethylhexyl (meth)acrylate and methoxy polyethylene glycol acrylate are more preferable. These can be used singly or as a mixture of two or more kinds thereof.

The content of the resin and/or elastomer for use in formation of the concavo-convex structure 3 can be appropriately adjusted from the viewpoints of, for example, sound insulation performance, production cost and other functions, and is not particularly limited. For example, the content is usually 70% by mass or more, preferably 80% by mass or more. The content may be 100% by mass, and is preferably 99% by mass or less.

When the concavo-convex structure 3 formed includes the photo-curable resin or elastomer, a photopolymerization initiator is preferably included from the viewpoints of, for example, moldability, an enhancement in mechanical strength and a reduction in production cost, and examples thereof can include benzoin-based, acetophenone-based, thioxanthone-based, phosphine oxide-based, and peroxide-based photopolymerization initiators. Specific examples of the photopolymerization initiator can include benzophenone, 4,4-bis(diethylamino)benzophenone, 2,4,6-trimethylbenzophenone, methyl o-benzoyl benzoate, 4-phenylbenzophenone, t-butylanthraquinone, 2-ethylanthraquinone, diethoxyacetophenone, 2-hydroxy-2-methyl-1-phenylpropan-1-one 2-hydroxy-1-{4-[4-(2-hydroxy-2-methyl-propionyl)-benzyl]phenyl}-2-methyl-propan-1-one, benzil dimethyl ketal, 1-hydroxycyclohexyl-phenylketone, benzoin methyl ether, benzoin ethyl ether, benzoin isopropyl ether, benzoin isobutyl ether, 2-methyl-[4-(methylthio)phenyl]-2-morpholino-1-propanone, 2-benzyl-2-dimethylamino-1-(4-morpholinophenyl)-butanone-1, diethylthioxanthone, isopropylthioxanthone, 2,4,6-trimethylbenzoyldiphenylphosphine oxide, bis(2,6-dimethoxybenzoyl)-2,4,4-trimethylpentylphosphine oxide, bis(2,4,6-trimethylbenzoyl)-phenylphosphine oxide and methyl benzoyl formate.

Such an initiator may be used as a single material or in any combination of two or more materials at any ratio.

The content of the photopolymerization initiator in the resin for use in formation of the concavo-convex structure 3 is not particularly limited, and is usually 0.1% by mass or more, preferably 0.3% by mass or more, more preferably 0.5% by mass or more, and usually 3% by mass or less, preferably 2% by mass or less from the viewpoints of an enhancement in mechanical strength and maintaining of an appropriate reaction rate.

The resin for use in formation of the concavo-convex structure 3 may include a particle, a plate, a spherical body and/or the like for the purpose of enhancements in sound insulation ability and other functions and/or the like. Such a material is not particularly limited, and examples include metals and inorganic or organic materials.

The convex portions 5 may each include an inorganic fine particle from the viewpoints of an enhancement in mechanical strength and a reduction in material cost. Examples can include inorganic fine particles having transparency, such as silicon oxide, aluminum oxide, titanium oxide, soda glass, and diamond. For example, any of particles of resins such as an acrylic resin, a styrene resin, a silicone resin, a melamine resin, an epoxy resin and any copolymer thereof can also be used for the fine particle, besides such an inorganic fine particle.

The resin for use in formation of the concavo-convex structure 3 may contain various additives such as a flame retardant, an antioxidant, a plasticizer, a defoamer and a release agent as any other component, as long as sound insulation performance is not inhibited, and such additives can be used singly or in combinations of two or more kinds thereof.

The flame retardant is an additive to be compounded in order to hardly burn or not ignite a combustible material. Specific examples thereof include bromine compounds such as pentabromodiphenyl ether, octabromodiphenyl ether, decabromodiphenyl ether, tetrabromobisphenol A, hexabromocyclododecane and hexabromobenzene, phosphorus compounds such as triphenyl phosphate, chlorine compounds such as chlorinated paraffin, antimony compounds such as antimony trioxide, metal hydroxides such as aluminum hydroxide, nitrogen compounds such as melamine cyanurate, and boron compounds such as sodium borate, but are not particularly limited.

The antioxidant is an additive to be compound in order to prevent oxidation degradation. Specific examples thereof include a phenolic antioxidant, a sulfur-based antioxidant and a phosphorus-based antioxidant, but are not particularly limited.

The plasticizer is an additive to be compound in order to improve flexibility and weather resistance. Specific examples thereof include phthalate, adipate, trimellitate, polyester, phosphate, citrate, sebacate, azelate, maleate, silicone oil, mineral oil, vegetable oil and any modified product thereof, but are not particularly limited.

[Support]

The sound insulation sheet 1 of the configuration can be appropriately disposed depending on the environment where sound insulation performance is exerted. For example, the sound insulation sheet 1 may be disposed directly on an apparatus, a structure or the like. An adhesion layer or the like may be provided between the sound insulation sheet 1 and such an apparatus, structure or the like. The sound insulation sheet 1 may be used in the state of being supported by the support 8. The sound insulation sheet 1 may be supported by the support 8 in sound insulation by use of the sound insulation sheet 1, and may not be supported by the support 8 in production, storage and/or the like.

The support 8 may be provided in contact with at least one surface or a plurality of surfaces of the substrate 2 of the sound insulation sheet 1.

The material constituting the support 8 is not particularly limited as long as it can support the substrate 2, and one higher in rigidity than the substrate 2 is preferable from the viewpoint of an enhancement in sound insulation performance.

When the sound insulation sheet 1 is disposed directly on an apparatus, a structure or the like, a surface on which the sound insulation sheet is to be disposed preferably has rigidity comparable with that of the support, for example, from the viewpoint of supporting of the sheet and from the viewpoint of an enhancement in sound insulation performance.

Specific examples of the material constituting the support 8 include organic materials such as polyacrylonitrile, polyethylene terephthalate, polybutylene terephthalate, polyethylene naphthalate, polyvinyl chloride, polyvinylidene chloride, polychlorotrifluoroethylene, polyethylene, polypropylene, polystyrene, cyclic polyolefin, polynorbornene, polyether sulfone, polyether ether ketone, polyphenylene sulfide, polyarylate, polycarbonate, polyamide, polyimide, triacetylcellulose, polystyrene, an epoxy resin, an acrylic resin and an oxazine resin, and any composite material where a metal such as aluminum, stainless steel, iron, copper, zinc or brass, and/or inorganic glass, an inorganic particle and/or a fiber is/are included in such an organic material, but are not particularly limited. Among them, the support 8 is preferably at least one selected from the group consisting of a photo-curable resin sheet, a thermosetting resin sheet, a thermoplastic resin sheet, a metal plate and an alloy plate from the viewpoints of, for example, sound insulation ability, rigidity, moldability and cost. The thickness of the support 8 is not particularly limited, and is usually preferably 0.1 mm or more and 50 mm or less from the viewpoints of, for example, sound insulation performance, rigidity, moldability, a decrease in weight, and cost.

The surface density of the support 8 is preferably 2.0 kg/m$^2$ or less, further preferably 1.5 kg/m$^2$ or less. When the surface density is too high, the weight ratio of the convex portions to the support is decreased to hardly allow the convex portions to function as "local rigidity-mass impartment". The surface density of the support 8 is within a proper range to thereby allow the convex portions to function as "local rigidity-mass impartment". When the support 8, which is high in surface density, is used, the space section 12 can be provided to result in an enhancement in sound insulation effect, as described below.

The shape of the support 8 can be appropriately set depending on a surface of the sound insulation structure 7, on which the support is disposed, and is not particularly limited. For example, the shape may be a flat sheet shape, a curved sheet shape, or a special shape which is processed so as to have, for example, a curved surface portion or a bent portion. Furthermore, for example, a cut or punched portion may also be provided at any position of the support 8 from the viewpoint of, for example, a decrease in weight.

[Molding Method]

The method for molding the sound insulation sheet 1 is not particularly limited, and a commonly known sheet molding method can be adopted. In the case of the thermosetting or thermoplastic resin or elastomer, examples include melt molding methods such as press molding, extrusion molding and injection molding, and molding conditions for performing melt molding in this case, such as temperature and pressure, can be appropriately modified depending on the type of the material used. In the case of the photo-curable resin or elastomer, for example, such a resin or the like can be injected to an active energy ray-permeable, plate-shaped mold, and irradiated with an active energy ray and thus photo-cured.

The active energy ray as a specified ray of light, for use in curing of the photo-curable resin or the like, may be any one as long as it can cure the photo-curable resin or the like used, and examples include ultraviolet light and electron beam. The amount of irradiation with the active energy ray may be any amount which allows the photo-curable resin used or the like to be cured, and, for example, irradiation with ultraviolet light at a wavelength of 200 to 400 nm is usually performed in the range from 0.1 to 200 J in consideration of the types and amounts of the monomer and the polymerization initiator. The light source of the active energy ray, here used, is, for example, a chemical lamp, a xenon lamp, a low-pressure mercury lamp, a high-pressure mercury lamp or a metal halide lamp. The irradiation with the active energy ray may be performed at one stage, and is preferably performed at a plurality of stages, at least two stages, in order to obtain a photo-curing resin sheet favorable in surface properties. The photo-curable resin, if used, may contain a curing accelerator.

The method for combining the substrate 2 and the convex portions 5 is not particularly limited, and either a method involving forming the convex portions 5 on the substrate 2 or a method involving allowing the convex portions 5 molded and the substrate 2 to adhere may be adopted. In the case of the adhering method, an adhesive is preferably used and the type of the adhesive is not limited as long as the adhesive can allow the convex portion 5 and the substrate 2 to adhere.

Next, one example of an aspect relating to molding of a sound insulation sheet member 1 by use of a thermosetting resin is described.

Figure 14:
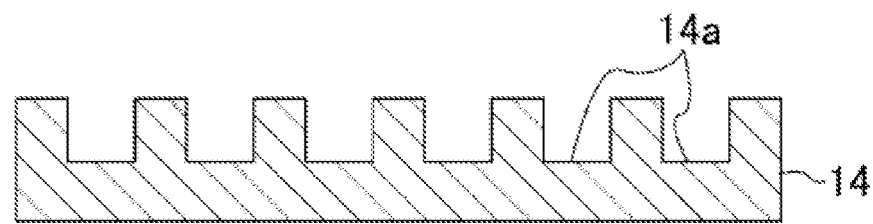
FIG. 14 is a view illustrating a schematic cut end surface of one example of a mold for use in production of a sound insulation sheet.

FIG. 14 illustrates a schematic cut end surface of a mold as one example, for use in molding of a sound insulation sheet member 1. A mold 14 illustrated has an upper surface on which a concavo-convex section corresponding to an outer shape of a concavo-convex structure 3 of the sound insulation sheet member 1, namely, a plurality of cavities (concave grooves) 14a whose surfaces are concaved in the form of grooves in a shape corresponding to the outer shape of convex portions 5 are formed.

The mold 14 can be used to mold the sound insulation sheet member 1 according to the following procedure.

First, the mold 14 is installed so that a surface thereof, on which the cavities 14a are formed, faces up, a photo-curable resin is allowed to flow into the cavities 14a and thus packed, and a sheet-shaped substrate 2 is stacked thereon, the substrate including a material through which a specified ray of light, such as ultraviolet light or electron beam, for curing the photo-curable resin penetrates.

Next, the substrate 2, which is pressure bonded on the upper surface of the mold 14, is irradiated with the specified ray of light from above, to thereby allow the photo-curable resin in the cavities 14a to be cured with the substrate 2 being interposed, and thus be fixed to the surface of the substrate 2.

Figure 15:
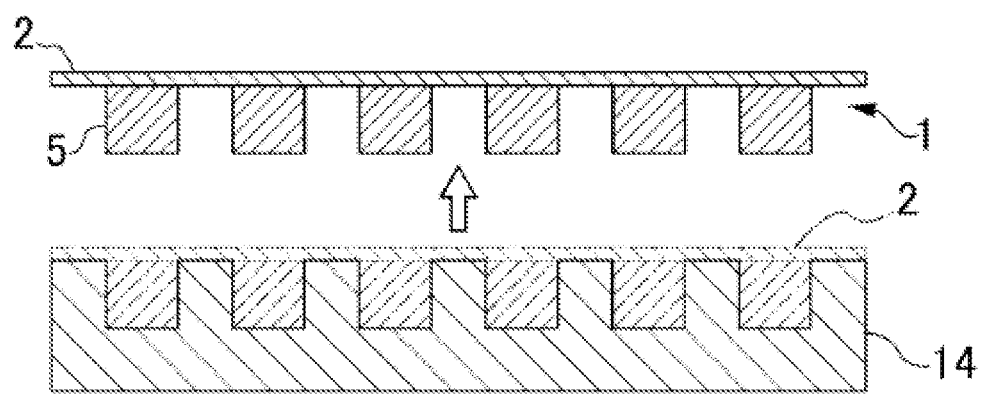
FIG. 15 is a view for describing a process for producing a sound insulation sheet by use of the mold of FIG. 14.

Once the photo-curable resin is cured, as illustrated in FIG. 15, the substrate 2 where the convex portions 5 are fixed to the surface can be released from the mold 14, to thereby obtain a light-shielding sheet member 1 where the concavo-convex structure 3 is formed on a surface of the substrate 2.

Figure 16A:
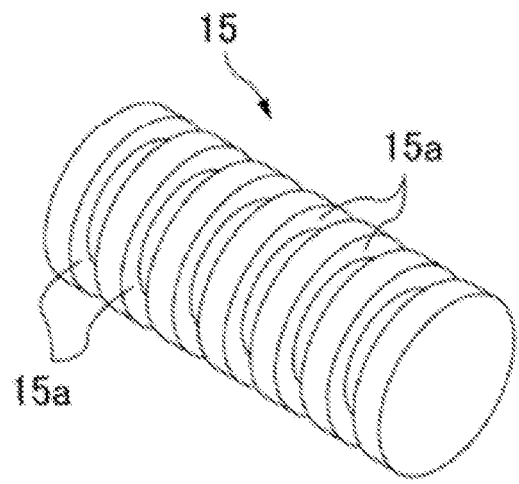
FIG. 16 (A) is a schematic outline view of a cylindrical mold, and FIG. 16 (B) is a view for describing a process for producing a sound insulation sheet by use of this mold.
Figure 16B:
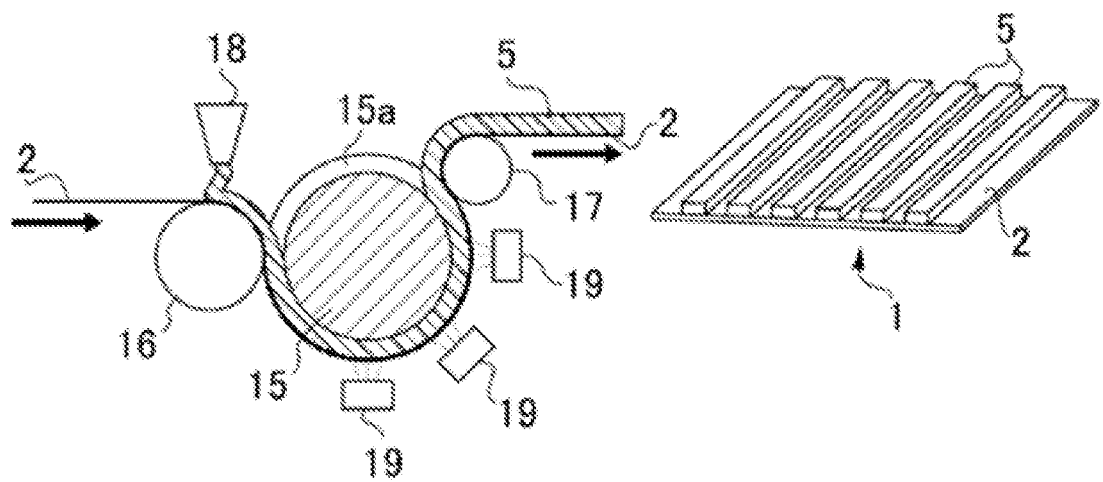

FIG. 16 illustrates an aspect relating to molding of the light-shielding sheet member 1 in a so-called roll-to-roll manner similarly by use of the photo-curable resin, a step of allowing the specified ray of light for curing the photo-curable resin to penetrate, and the long sheet-shaped substrate 2 including the material.

As illustrated in the Figure (A), a cylindrical roll-shaped mold 15 is used in this molding, in which a plurality of cavities 15a whose surfaces are concaved in the form of grooves in a shape corresponding to the outer shape of the convex portions 5 are formed on the periphery of the cylindrical roll-shaped mold along the circumferential direction. The long sheet-shaped substrate 2 is sent from a sheet feeding unit which supports a web roll on which a sheet-shaped substrate 2 not illustrated is wound, to thereby send the substrate 2, and not only the substrate is pressure bonded to and wound on the periphery of the mold 15 with any tension being provided by a pressure bonding roll 16 and a pressure bonding roll 17 placed respectively upstream and downstream of conveyance, as illustrated in the Figure (B), but also the substrate 2 passing through the pressure bonding roll 17 is wound by a sheet winding unit not illustrated.

A nozzle 18 which feeds the photo-curable resin is placed above the pressure bonding roll 16, and is provided so that the resin fed from the nozzle 18 flows into the cavities 15a of the mold 15 and is packed therein. A plurality of light sources 19 for irradiation with the specified ray of light are placed below the mold 15, and are provided so that the photo-curable resin packed into the cavities 15a is irradiated with the specified ray of light with the substrate 2 being interposed, and thus are cured. The mold 15 is provided so as to be rotated in synchronization with the sheet conveyance rates of the sheet feeding unit and the sheet winding unit.

In such an aspect, the light-shielding sheet member 1 can be formed according to the following procedure.

First, the tip of the long sheet-shaped substrate 2 is run out from the sheet feeding unit, and not only wound to the periphery of the mold 15, but also wound to the pressure bonding rolls 16 and 17 to provide tension, and the tip of the substrate 2 is attached to the sheet winding unit.

Next, while the substrate 2 is fed from the sheet feeding unit and wound by the sheet winding unit, the substrate 2 is wound to the mold 15 rotated, and at the same time, the photo-curable resin is allowed to flow out from the nozzle 18, and the photo-curable resin is packed into the cavities 15a of the mold 15.

While the substrate 2 wound to the mold 15 is rotated and transferred together with the mold 15 toward the pressure bonding roll 17, a surface of the substrate 2 is irradiated with the specified ray of light from any of the light sources 19 placed below the mold 15 to thereby lead to irradiation of the photo-curable resin in the cavities 15a with the specified ray of light with the substrate 2 being interposed, thereby allowing the photo-curable resin to be cured and fixed to the surface of the substrate 2. The speed of transfer of the substrate 2 wound to the mold 15 (rotational speed of the mold 15) is set to such an extent that, while the substrate 2 is wound by the mold 15, the photo-curable resin in the cavities 15a receives the specified ray of light radiated from any of the light sources 19 and thus completely cured.

The substrate 2 is then released from the mold 15 through the pressure bonding roll 17, the substrate 2, where the convex portions 5 are fixed onto the surface, is wound by the sheet winding unit, to thereby continuously form a long light-shielding sheet member 1, and the substrate 2 wound is cut to a dimension depending on the place for disposing, thereby enabling a light-shielding sheet member 1 having a desired size, on which the concavo-convex structure 3 is formed on a surface of the substrate 2, to be obtained.

The cavities 14a and 15a formed on the mold 14 and the mold 15 are linearly formed along with the outer shape of the convex portions 5, and thus the resin uniformly flow into the cavities 14a and 15a and bubbles hardly enter the cavities 14a and 15a, together with the resin.

[Plate Material]

The plate material 10 in the sound insulation structure 7 illustrated in FIG. 7 to FIG. 10 is a plate-shaped member, and is, for example, a plate material for forming an exterior plate of equipment.

The plate material 10 preferably has a surface density of 1 kg/m$^2$ or more and 20 kg/m$^2$ or less. The material of the plate material 10, here used, can be, for example, any plate material made of steel, stainless steel or aluminum.

The thickness of the plate material 10 used is varied depending on the specification of equipment, and one having a thickness of about 0.5 mm to 1.0 mm is widely used.

[Retention Unit]

The retention unit 11 is not restricted as long as it is placed in order to ensure any space between the sound insulation sheet 1 and the plate material 10 to thereby support the sound insulation sheet 1 on the plate material 10, and, for example, a hard or soft urethane material, or a gel sheet can be used as the retention unit 11.

The retention unit 11 is, for example, placed along with the peripheral edge sections of both the sound insulation sheet 1 and the plate material 10 so that the space section 12 as an air space or a space in which the sound absorbing material 13 is to be packed is formed between both the members 1 and 10, as illustrated in FIG. 7 and FIG. 8 above.

There is here caused no problem as long as the sound insulation sheet 1 and the plate material 10 are not in contact with each other, and the height (width) of the retention unit 12 may be set so that the interval (g) in the space section 12 is 0.1 mm or more and 50 mm or less.

The space section 12 between the sound insulation sheet 1 and the plate material 10, whose periphery is surrounded by the retention unit 11, is preferably sealed in order to prevent sound leakage.

In another mode of the sound insulation sheet 1, the sound insulation sheet 1 may have a configuration where the retention unit 11 may be integrally provided on the surface 2b of the substrate 2 of the sound insulation sheet 1 illustrated in each of the Figures.

[Sound Absorbing Material]

The sound absorbing material 13 is packed in the space section 12 between the sound insulation sheet 1 and the plate material 10, and functions to prevent vibration from being propagated from the plate material 10 to the sound insulation sheet 1.

The sound absorbing material 13 here used can be, for example, a non-woven fabric having a basis weight of 300 to 2000 g/m$^2$.

When the sound absorbing material 13 is packed in the space section 12 between the sound insulation sheet 1 and the plate material 10, the interval (g) in the space section 12 is preferably 5 mm or more and 50 mm or less.

Other examples of the sound absorbing material 13 here used can be glass wool, felt, urethane, rubber, polyethylene, polypropylene, polymer foam, or other known sound absorbing material such as a porous material.

[Method for Manufacturing Sound Insulation Structure]

The sound insulation structure 7 can be manufactured by an appropriate attachment procedure of each member, for example, attaching the retention unit 11 to the plate material 10, attaching the sound insulation sheet 1 onto the retention unit 11 attached or attaching one end of the retention unit 11 to the surface 2b of the substrate 2 of the sound insulation sheet 1, and attaching other end of the retention unit 11 to a surface of the plate material 10. Such attachment of members can be made using an appropriate fixation and integration means such as adhesion. The sound absorbing material 13 is packed between the sound insulation sheet 1 and the plate material 10 in an appropriate step of attachment to both such members.

[Sound Insulation Characteristics]

The sound transmission loss of the sound insulation sheet 1 is preferably 3 dB or more in terms of the difference in sound transmission loss at a peak frequency between the sound insulation sheet 1 and a planar sheet whose mass is the same as that of the sound insulation sheet 1. The sound transmission loss in the present invention means the difference between the sound pressure level at a predetermined location of a space (sound source room) where sound is generated and the sound pressure level at a predetermined location of another space (sound reception room) when sound is generated in one space of two spaces obtained by partitioning the sound insulation sheet 1. The peak frequency refers to a frequency at which sound insulation ability is most enhanced by the effect of the sound insulation sheet 1.

EXAMPLES

Hereinafter, the present invention is more specifically described with reference to Examples, but the present invention is not limited to the following Examples without departing from the gist thereof. The values of various conditions and evaluation results in Examples are represented as preferable ranges in the present invention, as in preferable ranges in the embodiments of the present invention. Such preferable ranges in the present invention can be determined in consideration of such preferable ranges in the embodiments and ranges represented by values in the following Examples or combinations of values in Examples.

[Raw Materials Used]

The following materials were used as raw materials.

(Materials for Formation of Convex Portions 5)

EBECRYL 230 (urethane acrylate manufactured by Daicel-Allnex Ltd., weight average molecular weight Mw: 5000)

Aronix M-120 (special acrylate manufactured by Toagosei Co., Ltd.)

IRGACURE 184 (1-hydroxy-cyclohexyl-phenyl-ketone manufactured by BASF SE)

IRGACURE TPO (2,4,6-trimethylbenzoyl-diphenyl-phosphine oxide manufactured by BASF SE)

(Substrate 2)

PET film (Diafoil, manufactured by Mitsubishi Chemical Corporation)

Film thickness: 125 μm, 250 μm

Production Example 1

Weighing was made at EBECRYL 230/Aronix M-120/IRGACURE 184/IRGACURE TPO=50/50/1/0.1% by mass, and stirring was performed by using Awatori Rentaro (AR-250 manufactured by Thinky Corporation) in conditions of stirring for 20 minutes and defoaming for 10 minutes, to thereby obtain mixture A.

Example 1

Mixture A obtained in Production Example 1 was allowed to flow into an A4 size mold which had substantially the same cut end section as that of the mold 14 illustrated in FIG. 14 and which was made of aluminum, in which concave groove shapes (cavities) each having a width of 6 mm and a height of 5 mm were arranged in one direction with each having a concave portion width of 5 mm, and thereafter, a PET film having a thickness of 125 μm, a Young's modulus of about 4 GPa, a specific gravity of 1.4 and a surface density of 0.175 kg/m$^2$ was put as a substrate on the mold, curing was performed by irradiation with ultraviolet light at a wavelength of 200 nm to 450 nm in an amount of energy of 1000 mJ/m$^2$ by use of a high-pressure mercury lamp and thus a sound insulation sheet was molded. Thereafter, the sound insulation sheet cured in the mold was released from the mold.

The sound insulation sheet obtained had a mode where long cuboid-shaped convex portions each having a width of 6 mm, a height of 5 mm and a concave portion width of 5 mm were arranged in one direction on a PET substrate having a thickness of 125 μm.

The specific gravity of the convex portions in the sound insulation sheet obtained was 1.05, the value of the expression (I) (w1max×t×sg/w2) was 6.3, and the value of the expression (II) (w1max×t) was 30.

Example 2

Mixture A obtained in Production Example 1 was allowed to flow into an A4 size mold which had substantially the same cut end section as that of the mold 14 illustrated in FIG. 14 and which was made of aluminum, in which concave groove shapes each having a width of 6 mm and a height of 5 mm were arranged in one direction with each having a concave portion width of 25 mm, and thereafter the same PET film as that used in Example 1 was put as a substrate on the mold, curing was performed by irradiation with ultraviolet light in the same manner as in Example 1 and thus a sound insulation sheet was molded. Thereafter, the sound insulation sheet cured in the mold was released from the mold.

The sound insulation sheet obtained had a mode where long cuboid-shaped convex portions each having a width of 6 mm, a height of 5 mm and a concave portion width of 25 mm were arranged in one direction on a PET substrate having a thickness of 125 μm.

The specific gravity of the convex portions in the sound insulation sheet obtained was 1.05, the value of expression (I) was 1.26, and the value of expression (II) was 30.

Example 3

Mixture A obtained in Production Example 1 was allowed to flow into an A4 size mold which had substantially the same cut end section as that of the mold 14 illustrated in FIG. 14 and which was made of aluminum, in which concave groove shapes each having a width of 6 mm and a height of 2.5 mm were arranged in one direction with each having a concave portion width of 25 mm, and thereafter the same PET film as that used in Example 1 was put as a substrate on the mold, curing was performed by irradiation with ultraviolet light in the same manner as in Example 1 and thus a sound insulation sheet was molded. Thereafter, the sound insulation sheet cured in the mold was released from the mold.

The sound insulation sheet obtained had a mode where long cuboid-shaped convex portions each having a width of 6 mm, a height of 2.5 mm and a concave portion width of 25 mm were arranged in one direction on a PET substrate having a thickness of 125 μm.

The specific gravity of the convex portions in the sound insulation sheet obtained was 1.05, the value of expression (I) was 0.63, and the value of expression (II) was 15.

Example 4

Mixture A obtained in Production Example 1 was allowed to flow into an A4 size mold which had substantially the same cut end section as that of the mold 14 illustrated in FIG. 14 and which was made of aluminum, in which concave groove shapes (cavities) each having a width of 6 mm and a height of 5 mm were arranged in one direction with each having a concave portion width of 5 mm, and thereafter a PET film having a thickness of 250 μm, a Young's modulus of about 4 GPa, a specific gravity of 1.4 and a surface density of 0.35 kg/m² was put as a substrate on the mold, curing was performed by irradiation with ultraviolet light in the same manner as in Example 1 and thus a sound insulation sheet was molded. Thereafter, the sound insulation sheet cured in the mold was released from the mold.

The sound insulation sheet obtained had a mode where long cuboid-shaped convex portions each having a width of 6 mm, a height of 5 mm and a concave portion width of 5 mm were arranged in one direction on a PET substrate having a thickness of 250 μm.

The specific gravity of the convex portions in the sound insulation sheet obtained was 1.05, the value of expression (I) was 6.3, and the value of expression (II) was 30.

Example 5

Mixture A obtained in Production Example 1 was allowed to flow into an A4 size mold which had substantially the same cut end section as that of the mold 14 illustrated in FIG. 14 and which was made of aluminum, in which concave groove shapes each having a width of 6 mm and a height of 2.5 mm were arranged in one direction with each having a concave portion width of 25 mm, and thereafter the same PET film as that used in Example 4 was put as a substrate on the mold, curing was performed by irradiation with ultraviolet light in the same manner as in Example 1 and thus a sound insulation sheet was molded. Thereafter, the sound insulation sheet cured in the mold was released from the mold.

The sound insulation sheet obtained had a mode where long cuboid-shaped convex portions each having a width of 6 mm, a height of 2.5 mm and a concave portion width of 25 mm were arranged in one direction on a PET substrate having a thickness of 250 μm.

The specific gravity of the convex portions in the sound insulation sheet obtained was 1.05, the value of expression (I) was 1.26, and the value of expression (II) was 15.

Example 6

Mixture A obtained in Production Example 1 was allowed to flow into an A4 size mold which had substantially the same cut end section as that of the mold 14 illustrated in FIG. 14 and which was made of aluminum, in which concave groove shapes each having a width of 6 mm and a height of 2.5 mm were arranged in one direction with each having a concave portion width of 25 mm, and thereafter the same PET film as that used in Example 4 was put as a substrate on the mold, curing was performed by irradiation with ultraviolet light in the same manner as in Example 1 and thus a sound insulation sheet was molded. Thereafter, the sound insulation sheet cured in the mold was released from the mold.

The sound insulation sheet obtained had a mode where long cuboid-shaped convex portions each having a width of 6 mm, a height of 2.5 mm and a concave portion width of 25 mm were arranged in one direction on a PET substrate having a thickness of 250 μm.

The specific gravity of the convex portions in the sound insulation sheet obtained was 1.05, the value of expression (I) was 0.63, and the value of expression (II) was 15.

Comparative Example 1

Mixture A obtained in Production Example 1 was allowed to flow into an A4 size mold made of aluminum, in which concave shapes each having a diameter of 6 mm and a height of 5 mm were provided with each having a concave portion width of 5 mm, and thereafter a PET film having a thickness of 250 μm, a Young's modulus of about 4 GPa, a specific gravity of 1.4 and a surface density of 0.35 kg/m² was put as a substrate on the mold, curing was performed by irradiation with ultraviolet light in the same manner as in Example 1 and thus a sound insulation sheet was molded. Thereafter, the sound insulation sheet cured in the mold was released from the mold.

Figure 17:
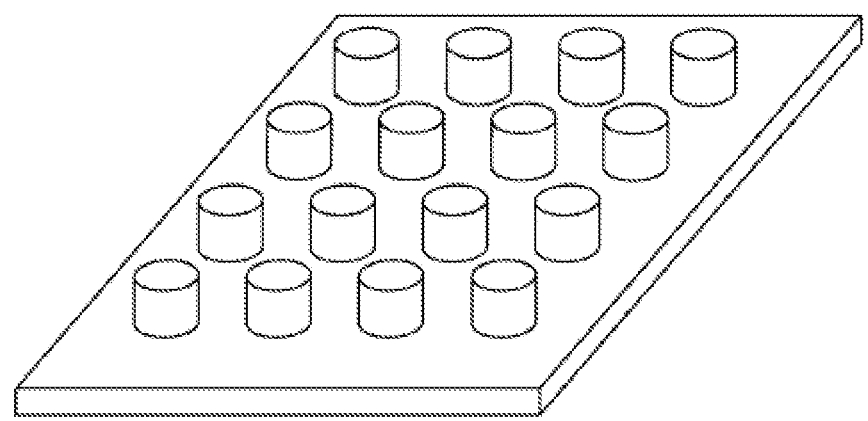
FIG. 17 is a schematic perspective view of any sound insulation sheet of Comparative Examples.

The sound insulation sheet obtained was a sound insulation sheet which presented an appearance illustrated in FIG. 17 and in which cylindrical protrusions each having a diameter of 6 mm, a height of 5 mm and a concave portion width of 5 mm were arranged in two directions on a PET substrate having a thickness of 250 μm.

The specific gravity of the convex portions in the sound insulation sheet obtained was 1.05, and, when the dimensions of formation of the cylindrical protrusions were applied to the expressions (I) and (II), the values of the expression (I) and the expression (II) were respectively 6.3 and 30.

Comparative Example 2

The convex portions in the sound insulation sheet obtained in Example 1 were cut, and were secured with an adhesive to a copper plate having a thickness of 250 μm so that the placement interval between the convex portions was 30 mm.

The sound insulation sheet obtained had a mode where long cuboid-shaped convex portions each having a width of 6 mm, a height of 5 mm and a concave portion width of 25 mm were arranged in one direction on a copper plate having a thickness of 250 μm.

Comparative Examples 3

The convex portions in the sound insulation sheet obtained in Example 1 were cut, and were secured with an adhesive to a non-woven fabric having a thickness of 125 μm so that the placement interval between the convex portions was 30 mm.

The sound insulation sheet obtained had a mode where long cuboid-shaped convex portions each having a width of 6 mm, a height of 5 mm and a concave portion width of 25 mm were arranged in one direction on a non-woven fabric having a thickness of 125 μm.

[Sound Transmission Loss]

The sound insulation sheets produced in Examples 1 to 6 and Comparative Examples 1 to 3 were each used to measure the sound transmission loss. The measurement value in Comparative Example 1 was defined as reference, and the difference between this measurement value and each measurement value in Examples and Comparative Examples was summarized in the Table represented in FIG. 18.

Measurement conditions of the sound transmission loss are shown below.

White noise was generated from the inside of a small size reverberation box to which the sound insulation sheet 1 was attached, and the sound transmission loss (TL, difference in sound pressure between mikes disposed inside and outside the reverberation box) was determined from the difference in sound pressure level between mikes disposed inside and outside the small size reverberation box, based on the following expression (1).

[Expression 1]

$$\text{TL [dB]} = L_{in} - L_{out} - 3 \quad (1)$$

$L_{in}$; sound pressure level (dB) of internal mike
$L_{out}$; sound pressure level (dB) of external mike
Incident sound; white noise
Distance between sample and mike; 10 mm It was found from comparison between Examples 1 to 6 and Comparative Example 1 as shown in the Table of FIG. 18 that the sound insulation sheet having the convex portions arranged in one direction was excellent in sound insulation performance in a low frequency band. It was presumed that the convex portions were arranged in one direction to thereby impart local rigidity-mass and enhance sound insulation strength in a low frequency band as compared with the case of arrangement in two directions. The sound insulation sheet of each of Examples had a shape which effectively generated the above-mentioned "local rigidity-mass impartment".

It could be confirmed from the results shown in the Table that the convex portions were not only arranged in one direction, but also formed in a specified range to result in an enhancement in sound insulation performance in a low frequency band.

Example 7

Mixture A obtained in Production Example 1 was allowed to flow into an A4 size mold made of aluminum, in which concave groove shapes (cavities) each having a width of 6 mm and a height of 5 mm were arranged in one direction with each having a concave portion width of 25 mm, and thereafter a PET film having a thickness of 250 μm, a Young's modulus of about 4 GPa, a specific gravity of 1.4 and a surface density of 0.175 kg/m² was put as a substrate on the mold, curing was performed by irradiation with ultraviolet light at a wavelength of 200 nm to 450 nm in an amount of energy of 1000 mJ/m² by use of a high-pressure mercury lamp and thus a sound insulation sheet was molded. Thereafter, the sound insulation sheet cured in the mold was released from the mold.

The sound insulation sheet obtained was substantially the same as that illustrated in FIG. 1, and had a mode where long cuboid-shaped convex portions 5 each having a width of 6 mm, a height of 5 mm and a concave portion width of 25 mm were arranged in one direction on a PET substrate having a thickness of 250 μm. The specific gravity of the convex portions in the sound insulation sheet obtained was 1.05, the value of the expression (I) (w1max×t×sg/w2) was 6.3, and the value of the expression (II) (w1max×t) was 30.

Such a sound insulation sheet member was attached on a surface of a plate material 10 including a steel plate having a thickness of 0.6 mm and a surface density of 4.7 kg/m², with a gel retention unit 11 having a height of 15 mm being interposed, and a sound insulation structure 7 where a space section 12 at an interval (g) of 15 mm was provided between the sound insulation sheet member and the plate material 10 illustrated in FIG. 7 was formed. The retention unit 11 was provided along with the peripheral parts of the sound insulation sheet member 1 and the plate material 10, and the space section 12 was sealed.

Example 8

A sound insulation structure 7 was formed in the same manner as in Example 7 except that urethane having a height of 3 mm was used as the retention unit 11.

Example 9

A sound insulation structure 7 was formed in the same manner as in Example 7 except that gel having a height of 15 mm was used as the retention unit 11 and ultrafine acrylic fiber XAI (basis weight 1000 g/m², thickness 15 mm) was packed as the sound absorbing material 13 in the space section 12.

Example 10

Mixture A obtained in Production Example 1 was allowed to flow into an A4 size mold made of aluminum, in which concave shapes each having a diameter of 6 mm and a height of 5 mm were provided with each having a concave portion width of 12 mm, and thereafter a PET film having a thickness of 250 μm, a Young's modulus of about 4 GPa was put as a substrate on the mold, and curing was performed by irradiation with ultraviolet light at a wavelength of 200 to 450 nm in an amount of energy of 1000 mJ/m² by use of a high-pressure mercury lamp. Thereafter, the sound insulation sheet cured in the mold was released from the mold.

The sound insulation sheet obtained was substantially the same as that illustrated in FIG. 11, and had a mode having a convex-shaped resonance part of protrusions 51 each having a diameter of 6 mm, a height of 5 mm and a concave portion width of 12 mm, on a PET substrate having a thickness of 250 μm. The weight per unit shape was 150 mg.

The sound insulation sheet was attached on a surface of a plate material 10 including a steel plate having a thickness of 0.6 mm, with a gel retention unit 11 having a height of 15 mm being interposed, and a sound insulation structure 7 where a space section 12 at an interval (g) of 15 mm was provided between the sound insulation sheet 1 and the plate material 10 illustrated in FIG. 7 was formed. The retention unit 11 was provided along with the peripheral parts of the sound insulation sheet 1 and the plate material 10, and the space section 12 was sealed.

Example 11

A sound insulation structure 7 was formed in the same manner as in Example 10 except that ultrafine acrylic fiber XAI (basis weight 1000 g/m², thickness 15 mm) was used as the sound absorbing material 13 in the space section 12.

Comparative Example 4

A sound insulation structure was produced by directly bonding the sound insulation sheet produced in Example 7 to a surface of a plate material 10 including a steel plate having a thickness of 0.6 mm.

Comparative Example 5

A planar sheet having the same mass as that of the sound insulation sheet member produced in Example 7 was produced, and the planar sheet was used as a sound insulation sheet member to form a sound insulation structure in the same manner as in Example 7.

The sound insulation structures produced in Examples 7 to 11 and Comparative Examples 4 to 5 were each used to measure the sound transmission loss in the same manner as described above. The measurement value in Comparative Example 4 was defined reference, and the difference between this measurement value and each measurement value in Examples and Comparative Examples was summarized. The measurement results are shown in the Table of FIG. 19.

As shown in the Table of FIG. 19, it has been confirmed from the measurement results in each Example and each Comparative Example above that the sound insulation structure 7 of the present invention, in which the space section 12 is provided between the sound insulation sheet member 1 having the concavo-convex structure 3 and the plate material 10 and the space section 12 is defined as a sealed space, thus leads to an enhancement in sound insulation performance in a low frequency band.

Example 12

The sound insulation structure 7 in Example 7, here having a spatial distance of 20 mm, was produced, and evaluated in the same manner as in Example 7.

Example 13

A sound insulation structure 7 was produced using member 101 as the sound insulation sheet produced in Example 7, and member 102 as the sound insulation sheet produced in Example 10, and evaluated in the same manner as in Example 7.

Figure 20:
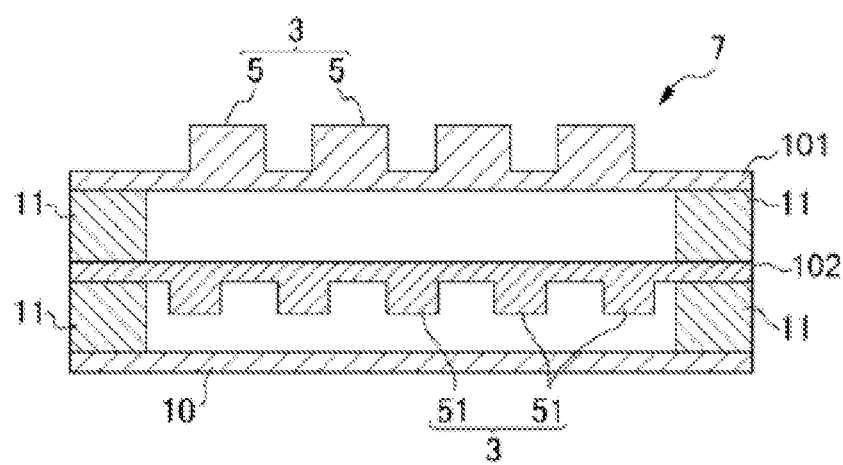
FIG. 20 is a schematic cross-sectional view of a sound insulation structure in Example 13.

The sound insulation structure 7 was such that member 102 was attached to a surface of a plate material 10 including a steel plate with a gel retention unit 11 having a height of 5 mm being interposed, and furthermore member 101 was attached with the gel retention unit 11 being interposed, as illustrated in FIG. 20. The interval between member 101 and the plate material 10 was 20 mm. A space section between the plate material 10 and member 102 with the retention unit 11 being interposed, and a second space section between member 102 and member 101 again with the retention unit 11 being interposed, were provided, and both the space sections were sealed.

The evaluation results of Example 12 and Example 13 are shown in the Table of FIG. 21.

While suitable embodiments according to the present invention are described with reference to the accompanied drawings, it goes without saying that the present invention is not limited to such embodiments. Various shapes, configurations and the like of the respective configuration members shown in the above examples are each merely one example, and can be variously modified based on design requirements and the like without departing from the gist of the present invention.

REFERENCE SIGNS LIST

1 sound insulation sheet member, 2 substrate, 2a, 2b surface of substrate, 3 concavo-convex structure, 4 concavo-convex unit shape, 5 convex portion, 5a base, 5b weight, 51 protrusion, 6 concave portion, 7 sound insulation structure, 8 support, 9 rib-shaped protrusion, 10 plate material, 11 retention unit, 12 space section, 13 sound absorbing material, 14, 15 mold, 16, 17 pressure bonding roll, 18 nozzle, 19 light source

The invention claimed is:

1. A sound insulation sheet comprising a concavo-convex structure on at least one surface of a sheet-shaped substrate, wherein
   the concavo-convex structure comprises a plurality of rows of continuous convex protrusions from a sheet surface of the substrate separated by rows of concave portions,
   the rows of continuous convex protrusions are linearly arranged in one direction with respect to one another and do not overlap,
   each row of continuous convex protrusion has a length in a longitudinal direction and a width in a transverse direction wherein a ratio of a maximum length in the longitudinal direction to the width in the transverse direction is 35 or more,
   a shape of a transverse section of the rows of continuous convex protrusions is selected from the group consisting of a square shape, a rectangular shape, a trapezoidal shape, a semicircular shape and an oval shape, and
   the substrate has a Young's modulus of 1 GPa or more and 10 GPa or less.

2. The sound insulation sheet according to claim 1, wherein the substrate has a thickness (d) of 30 μm or more and 500 μm or less.

3. The sound insulation sheet according to claim 1, wherein the rows of continuous convex protrusions have a height (t) of 0.5 mm or more and 10 mm or less.

4. The sound insulation sheet according to claim 1, wherein
   the concavo-convex structure is within ranges determined by expressions (I) and (II):

$$0.1 \leq w1\max \times t \times sg/w2 \leq 10 \qquad \text{Expression (I)}$$

$$5 \leq w1\max \times t \leq 50 \qquad \text{Expression (II)}$$

wherein a maximum width of a transverse section of a row of continuous convex protrusion is w1max (mm), a height of a row of continuous convex protrusion is t (mm), a width of a concave row is w2 (mm) and a specific gravity of the row of continuous convex protrusion is sg.

5. The sound insulation sheet according to claim 4, wherein a transverse section of the row of continuous convex protrusion has a maximum width (w1max) of 0.5 mm or more and 10 mm or less.

6. The sound insulation sheet according to claim 4, wherein the concave row has a width (w2) of 3 mm or more and 100 mm or less.

7. A method for manufacturing the sound insulation sheet according to claim 1, comprising flowing a photo-curable resin into a plurality of continuous concave grooves provided on a surface of a mold, overlapping with the mold, a substrate sheet through which a specified ray of light penetrates, the sheet being placed with facing the concave grooves into which the photo-curable resin flows, and subjecting the resultant overlapping arrangement to pressure bonding, irradiating with the specified ray of light through the substrate sheet to thereby cure the photo-curable resin in the concave grooves and fix the photo-curable resin to the substrate sheet, and releasing the substrate sheet from the mold.

8. The method for manufacturing a sound insulation sheet according to claim 7, wherein the mold is a roll-shaped mold obtained by providing on its periphery, the plurality of concave grooves each extending along a circumferential direction.

9. A sound insulation structure comprising the sound insulation sheet according to claim 1, and a support which supports a surface of the substrate.

10. A sound insulation structure comprising the sound insulation sheet according to claim 1 and a plate material provided opposite to the sound insulation sheet, wherein a space section is provided between the sound insulation sheet and the plate material.

11. A sound insulation structure according to claim 10. comprising a retention unit provided between the sound insulation sheet and the plate material, wherein the space section is a space section formed together with the support.

12. The sound insulation structure according to claim 11, wherein the space section provided between the sound insulation sheet and the plate material is a sealed space closed by the sound insulation sheet, the plate material and the retention unit.

13. The sound insulation structure according to claim 11, wherein the retention unit is in a form of a frame.

14. The sound insulation structure according to claim 10, wherein a placement interval (g) between the sound insulation sheet and the plate material in the space section is 0.1 mm or more and 50 mm or less.

15. The sound insulation structure according to claim 10, wherein a sound absorbing material is packed in the space section.

16. The sound insulation structure according to claim 15, wherein the sound absorbing material is a non-woven fabric.

17. The sound insulation structure according to claim 10, wherein the plate material has a surface density of 1 kg/m² or more and 20 kg/m² or less.

18. A sound insulation structure having a configuration comprising:
a sound insulation sheet having a concavo-convex structure according to claim 1 on at least one surface of a substrate,
a plate material provided opposite to the sound insulation sheet, and
a retention unit provided between the sound insulation sheet and the plate material, wherein
a space section formed by the sound insulation sheet, the plate material and the retention unit is provided between the sound insulation sheet and the plate material.

19. The sound insulation structure according to claim 18, wherein the space section provided between the sound insulation sheet and the plate material is a sealed space closed by the sound insulation sheet, the plate material and the retention unit.

20. The sound insulation structure according to claim 18, wherein the retention unit is in a form of a frame.

21. The sound insulation structure according to claim 18, wherein a placement interval (g) between the sound insulation sheet and the plate material in the space section is 0.1 mm or more and 50 mm or less.

22. The sound insulation structure according to claim 18, wherein a sound absorbing material is packed in the space section.

23. The sound insulation structure according to claim 22, wherein the sound absorbing material is a non-woven fabric.

24. The sound insulation structure according to claim 18, wherein the concavo-convex structure is within ranges determined by expressions (I) and (II):

$$0.1 \leq w1max \times t \times sg/w2 \leq 10 \quad \text{Expression (I)}$$

$$5 \leq w1max \times t \leq 50 \quad \text{Expression (II)}$$

wherein a maximum width of a transverse section of a row of continuous convex protrusion is w1max (mm), a height of a row of continuous convex protrusion is t (mm), a width of the a concave row is w2 (mm) and a specific gravity of the row of continuous convex protrusion is sg.

25. The sound insulation structure according to claim 18, wherein a proportion of an area of the concavo-convex structure in an area of one surface of the substrate is 5% or more and 80% or less.

26. The sound insulation structure according to claim 18, wherein the concavo-convex structure of the sound insulation sheet comprises at least one selected from the group consisting of a thermosetting or photo-curable elastomer, a thermoplastic elastomer, a thermosetting or photo-curable resin and a thermoplastic resin.

27. The sound insulation structure according to claim 18, wherein the substrate of the sound insulation sheet has a Young's modulus of 1 GPa or more.

28. The sound insulation structure according to claim 18, wherein the plate material has a surface density of 1 kg/m² or more and 20 kg/m² or less.

* * * * *